United States Patent
Prescott et al.

(10) Patent No.: US 9,080,677 B2
(45) Date of Patent: Jul. 14, 2015

(54) VALVE ASSEMBLY

(71) Applicant: Haldex Brake Products Limited, Warwickshire (GB)

(72) Inventors: Robert David Prescott, Solihull West Midlands (GB); Laurence John Potter, Birmingham West Midlands (GB); Edward Gilbert Shaw, Worcestershire (GB)

(73) Assignee: Haldex Brake Products Limited, Nuneaton Warwichshire (GB)

( * ) Notice: Subject to any disclaimer, the term of this patent is extended or adjusted under 35 U.S.C. 154(b) by 0 days.

(21) Appl. No.: 14/365,439

(22) PCT Filed: Dec. 14, 2012

(86) PCT No.: PCT/GB2012/053137
§ 371 (c)(1),
(2) Date: Jun. 13, 2014

(87) PCT Pub. No.: WO2013/093433
PCT Pub. Date: Jun. 27, 2013

(65) Prior Publication Data
US 2014/0345728 A1    Nov. 27, 2014

(30) Foreign Application Priority Data

Dec. 21, 2011  (GB) .................................... 1122011.8
Mar. 27, 2012  (GB) .................................... 1205382.3

(51) Int. Cl.
*F15B 13/02*        (2006.01)
*F16K 11/07*        (2006.01)
(Continued)

(52) U.S. Cl.
CPC ................ *F16K 11/07* (2013.01); *B60T 8/327* (2013.01); *B60T 13/662* (2013.01); *B60T 13/683* (2013.01); *B60T 15/025* (2013.01); *B60T 15/027* (2013.01); *F16K 15/186* (2013.01)

(58) Field of Classification Search
CPC ....... F16K 11/07; F16K 15/186; B60T 8/327; B60T 13/662; B60T 13/683; B60T 15/027; B60T 15/025
USPC ........... 137/596, 596.1, 596.18, 596.2, 627.5, 137/625.66
See application file for complete search history.

(56) References Cited

U.S. PATENT DOCUMENTS 2,754,840 A * 7/1956 Hicks, Jr. ................... 137/454.6
3,977,734 A * 8/1976 Ronnhult et al. .......... 303/119.3
(Continued)

FOREIGN PATENT DOCUMENTS

DE  44 15 925    12/1994
EP  0 140 862    5/1985
(Continued)

OTHER PUBLICATIONS
Search Report dated Jul. 17, 2012, United Kingdom Patent Application No. GB1205382.3.
(Continued)

*Primary Examiner* — John K Fristoe, Jr.
*Assistant Examiner* — Minh Le
(74) *Attorney, Agent, or Firm* — Young Basile Hanlon & MacFarlane P.C.

(57) ABSTRACT

A valve assembly comprising an inner housing in which is provided a first port, a second port, and a third port, and a valve member assembly which is movable between a first position, a second position, and a third position. An outer housing is separate from and encloses at least part of the inner housing, the outer housing having a first port and a second port, the Inner housing and outer housing each being provided with first mating parts, which engage to provide a substantially fluid tight seal while enclosing a conduit for fluid communication between the first port of the inner housing and the first port of the outer housing, and second mating parts, which engage to provide a substantially fluid tight seal while enclosing a conduit for fluid communication between the second port of the Inner housing and the second port of the outer housing.

17 Claims, 17 Drawing Sheets

Figure 1:
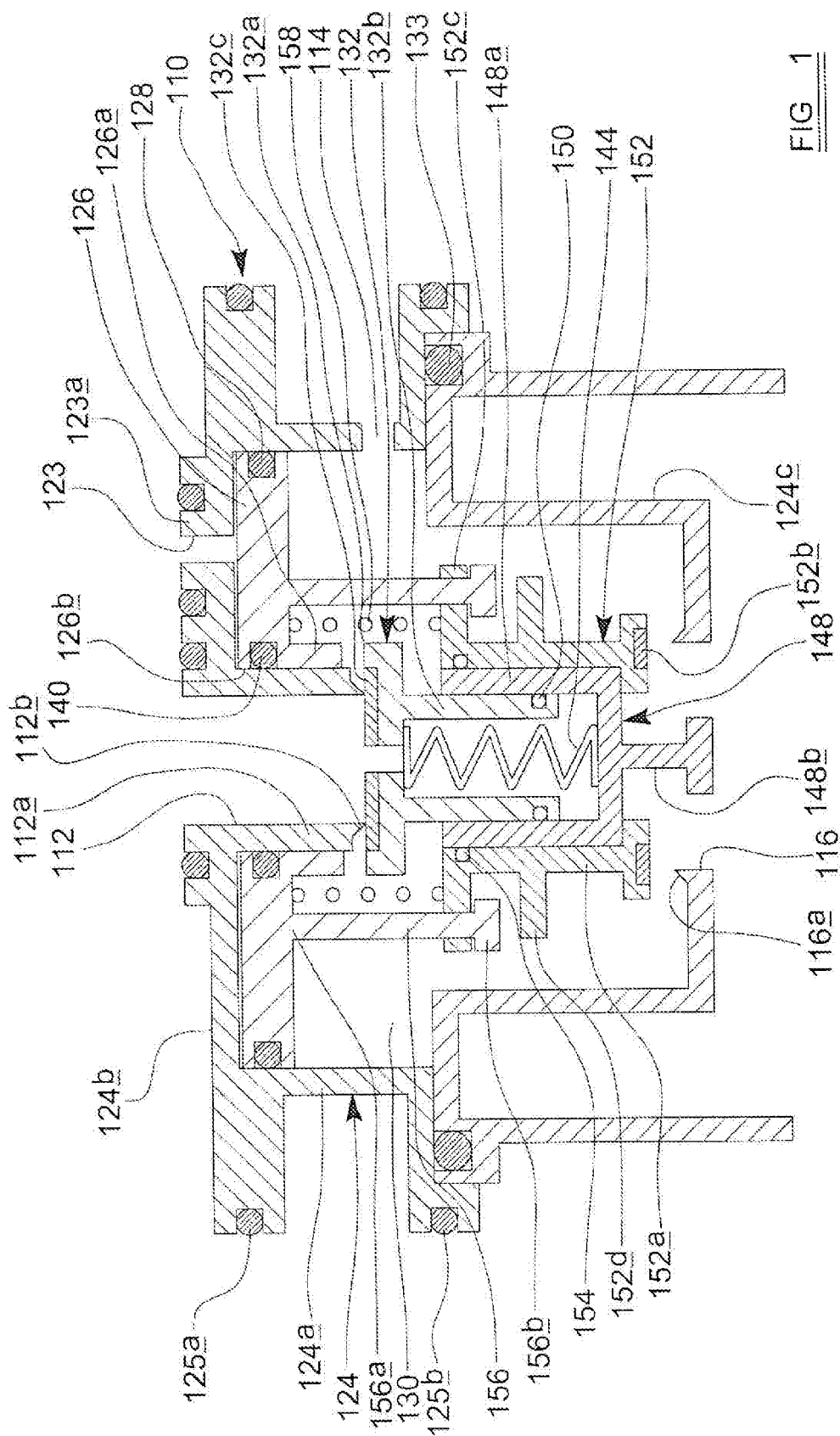

(51) Int. Cl.
*B60T 8/32* (2006.01)
*B60T 13/66* (2006.01)
*B60T 13/68* (2006.01)
*B60T 15/02* (2006.01)
*F16K 15/18* (2006.01)

(56) References Cited

U.S. PATENT DOCUMENTS

| | | | | |
|---|---|---|---|---|
| 4,037,879 | A | * | 7/1977 | Horowitz ................. 303/22.2 |
| 4,466,672 | A | * | 8/1984 | Maddrick ................. 303/22.1 |
| 4,499,921 | A | * | 2/1985 | Stoll ....................... 137/627.5 |
| 4,627,668 | A | * | 12/1986 | Camm ......................... 303/40 |
| 5,897,174 | A | * | 4/1999 | Ehrlich ......................... 303/40 |
| 5,906,351 | A | * | 5/1999 | Aardema et al. ........... 251/30.01 |
| 5,947,239 | A | | 9/1999 | Koelzer ....................... 188/352 |
| 6,238,013 | B1 | * | 5/2001 | Koelzer ..................... 303/118.1 |
| 7,147,006 | B2 | * | 12/2006 | Shaw et al. ................ 137/627.5 |
| 7,229,063 | B2 | * | 6/2007 | Hameister et al. ....... 251/129.15 |
| 7,389,795 | B2 | * | 6/2008 | Potter et al. .............. 137/625.64 |
| 7,438,276 | B2 | * | 10/2008 | Yoshikawa et al. ...... 251/129.08 |
| 7,647,942 | B2 | * | 1/2010 | Weston ......................... 137/503 |
| 8,231,818 | B2 | * | 7/2012 | Bamber ......................... 264/273 |
| 2002/0069920 | A1 | * | 6/2002 | Reinelt et al. ............ 137/625.66 |
| 2002/0124891 | A1 | * | 9/2002 | Frank et al. ................... 137/596 |
| 2004/0035478 | A1 | * | 2/2004 | Herbst et al. .............. 137/627.5 |
| 2005/0087243 | A1 | * | 4/2005 | Shaw et al. ............... 137/625.64 |
| 2006/0099090 | A1 | | 5/2006 | Kramp et al. |
| 2007/0186985 | A1 | * | 8/2007 | Potter et al. .............. 137/596.16 |
| 2010/0199844 | A1 | * | 8/2010 | Hilberer ......................... 96/118 |
| 2011/0042604 | A1 | * | 2/2011 | Jens ............................... 251/324 |
| 2011/0297494 | A1 | * | 12/2011 | Shaw et al. ..................... 188/152 |
| 2012/0031717 | A1 | * | 2/2012 | Prescott et al. .............. 188/151 R |
| 2012/0145252 | A1 | * | 6/2012 | Hunnicutt ....................... 137/14 |
| 2013/0263953 | A1 | * | 10/2013 | Prescott et al. ........... 137/625.42 |

FOREIGN PATENT DOCUMENTS

| | | |
|---|---|---|
| EP | 0 274 781 | 7/1988 |
| EP | 2 311 672 | 4/2011 |
| GB | 2 407 131 | 4/2005 |
| GB | 2467957 | 8/2010 |
| WO | 2011151645 | 12/2011 |

OTHER PUBLICATIONS

Search Report dated May 2, 2012, United Kingdom Patent Application No. GB1122011.8.

International Search Report dated Mar. 8, 2013, International Application No. PCT/GB2012/053137.

* cited by examiner

VALVE ASSEMBLY

CROSS-REFERENCE TO RELATED APPLICATIONS

This application is the national stage application of, and claims priority to, International Application No. PCT/GB2012/053137 filed Dec. 14, 2012, which was published in the English language on Jun. 27, 2013 as International Publication No. WO 2013/093433. International Application No. PCT/GB2012/053137 claims the benefit of United Kingdom Patent Application No. 1122011.8 filed Dec. 21, 2011 and United Kingdom Patent Application No. 1205382.3 filed Mar. 27, 2012.

DESCRIPTION OF INVENTION

The invention relates to a valve assembly, in particular to a valve assembly for use in a vehicle braking system in regulating the flow of pressurised fluid to a fluid pressure operated brake actuator.

Vehicle braking systems typically include a valve assembly known as a modulator which is connected to a source of pressurised fluid, the modulator being used to amplify the flow of pressurised fluid to and from a fluid pressure operated brake actuator. The modulator has a supply inlet which is connected to the source of pressurised fluid, a delivery port which is connected to the brake actuator and an exhaust outlet which is connected to the atmosphere (or any other low pressure volume), and can adopt a build position in which flow of fluid between the supply inlet and the delivery port is permitted, an exhaust position in which flow of fluid between the delivery outlet and the exhaust outlet is permitted, and a hold position in which flow of fluid between any two of the exhaust inlet, delivery port and exhaust outlet is substantially prevented.

In conventional braking systems, control of the modulator is achieved using a pressurised fluid signal known as the braking demand signal. When there is driver demand for braking, the driver typically operates a foot pedal, and movement of the foot pedal generates a fluid signal which is transmitted to a control inlet of the modulator. Receipt of the braking demand signal causes the modulator to move to the build position, so that the supply of pressurised fluid from the source of pressurised fluid to the brake actuator required to operate the vehicle brake commences. When the fluid pressure in the brake actuator approaches the pressure of the braking demand signal, the modulator moves to the hold or "lapped" position. Finally, when the driver releases the brake pedal, there is no longer demand for braking, the braking demand signal is removed, and the modulator reverts to the exhaust position, so that the pressurised fluid in the brake actuator acting to apply the vehicle brake is exhausted to the atmosphere.

If the vehicle is provided with anti-lock braking, the braking system includes at least one electrically operable valve which can override the braking demand signal. This is controlled using an electronic braking control unit (ECU) in accordance with conventional ABS control algorithms momentarily to release the brake pressure by moving the modulator to the exhaust position, or hold the brake pressure by moving the modulator to the hold position, even if there is braking demand, if wheel lock is detected.

In electronic braking systems, the braking system is provided with an electrically operable hold and an exhaust valve. Operation of the foot pedal generates an electrical braking demand signal, and this is transmitted to the ECU, which operates the hold valve and exhaust valve to control the modulator to build, hold or release the pressure in the brake actuator as described above. In this case, supply of fluid to the control inlet is also from the supply of pressurised fluid.

According to a first aspect of the invention we provide a valve assembly comprising an inner housing in which is provided a first port, a second port, and a third port, there being located in the inner housing a valve member assembly which is movable between a first position in which the second port is connected to the third port whilst the first port is closed, a second position in which the first port is connected to the second port whilst the third port is closed, and a third position in which at least two of the first, second and third ports are closed, wherein the valve assembly further comprises an outer housing which is separate from and encloses at least part of the inner housing, the outer housing having a first port and a second port, the inner housing and outer housing each being provided with first mating parts, which engage to provide a substantially fluid tight seal between the inner housing and the outer housing whilst enclosing a conduit for fluid communication between the first port of the inner housing and the first port of the outer housing, and second mating parts, which engage to provide a substantially fluid tight seal between the inner housing and the outer housing whilst enclosing a conduit for fluid communication between the second port of the inner housing and the second port of the outer housing.

All modulators have some common standard features—the supply inlet, a delivery outlet and an exhaust port. The location and the size of the conduits which connect to the supply inlet, and delivery outlet may vary from system to system. The modulator may, for example, be located in a wheel-end unit, i.e. directly adjacent the wheel it is used to brake, or it may be located in a centrally located braking control unit for a truck or a trailer. A central vehicle braking control unit mounted on a truck may control operation of the truck brakes only.

Moreover, the delivery outlet may be connected to more than one working volume. For example, the number of brake actuators controlled by one modulator varies from system to system. It is common, for example, for all the brake actuators associated with wheels on one side of the vehicle to be controlled by a single modulator, whilst all the brake actuators associated with wheels on one side of the vehicle to be controlled by a different modulator. This is known as side-wise control, and it will be appreciated that in this arrangement the number of brake actuators controlled by each modulator depends on the number of braked wheels on the vehicle. Axle-wise control is also used—where a modulator controls the two brake actuators associated with the two wheels on a single axle. It is also known to use a combination of side-wise control and axle-wise control. For example, a braking system may include a modulator for controlling the braking of both wheels on the steering axle of the vehicle, a modulator for controlling the braking of the remaining wheels on the left-hand side of the vehicle, and a modulator for controlling the braking of the remaining wheels on the right-hand side of the vehicle. Alternatively, the modulator may be provided in a wheel end unit directly adjacent the single brake actuator it operates. It will, therefore be appreciated that the number of fluid connections to the delivery outlet varies from system to system.

Producing different configurations of modulator for all these different types of braking systems is inconvenient, but, by virtue of providing the modulator with an inner and outer housing, the configuration of the inner housing and valve member assembly may be standardised, whilst the configuration of the outer housing is tailored to fit a particular type of braking system. Volume production of modulators may therefore be simplified.

The inner housing may be provided with a fourth port flow which is connected to the valve member assembly such that the pressure of fluid at the fourth port controls movement of the valve member assembly between the first position, second position and the third position. In this case, preferably the outer housing is also provided with a third port and a third mating part which engages with a third mating part of the inner housing to provide a substantially fluid tight seal between the inner housing and the outer housing whilst enclosing a conduit for fluid communication between the fourth port of the inner housing and the third port of the outer housing.

By virtue of the provision of this fourth port, the modulator may be connected to a fluid pressure control signal, and the fluid pressure control signal used to control movement of the valve member assembly between the first, second and third positions.

Preferably the inner housing encloses a volume and the valve member assembly includes a movable element such as a piston or diaphragm which main chamber, the first, second and third ports extending into the main chamber, and the fourth port extending into the control chamber.

Preferably the first port and the fourth port are provided in the same side of the inner housing. In this case, the fourth port in the inner housing may comprise a generally annular aperture in the inner housing which surrounds and is substantially coaxial with the first port.

Moreover, the inner housing may be provided with a fifth port flow which is connected to the control chamber and the outer housing is also provided with a fourth port and a fourth mating part which engages with a fourth mating part of the inner housing to provide a substantially fluid tight seal between the inner housing and the outer housing whilst enclosing a conduit for fluid communication between the fifth port of the inner housing and the fourth port of the outer housing.

Preferably the first port, the fourth port and the fifth port are provided in the same side of the inner housing.

The outer housing may be provided with a plurality of ports in fluid communication with the second port of the inner housing.

The outer housing may be formed in two parts, the ports being provided in a first part of the outer housing, and electrical control components by means of which operation of the or each electrically operated valve may be effected being mounted on the second part.

The inner housing may be placed in the outer housing by translational movement in a first direction, and the inner housing secured relative to the outer housing by a locking means which comprises a locking part which engages with the surface of one or both of the inner housing and outer housing to prevent separation of the inner housing and outer housing, release of the locking means to permit separation of the inner housing and outer housing being achieved by sliding the locking part along said surface in a second direction generally perpendicular to the said first direction.

In one embodiment of the invention, the inner housing is secured relative to the outer housing by means of a bayonet connection.

In this case the inner housing may be provided with a male bayonet connector formation which is located in a corresponding recess provided in the outer housing.

Alternatively, the inner housing may be secured relative to the outer housing by means of a slide lock.

Figure 2:
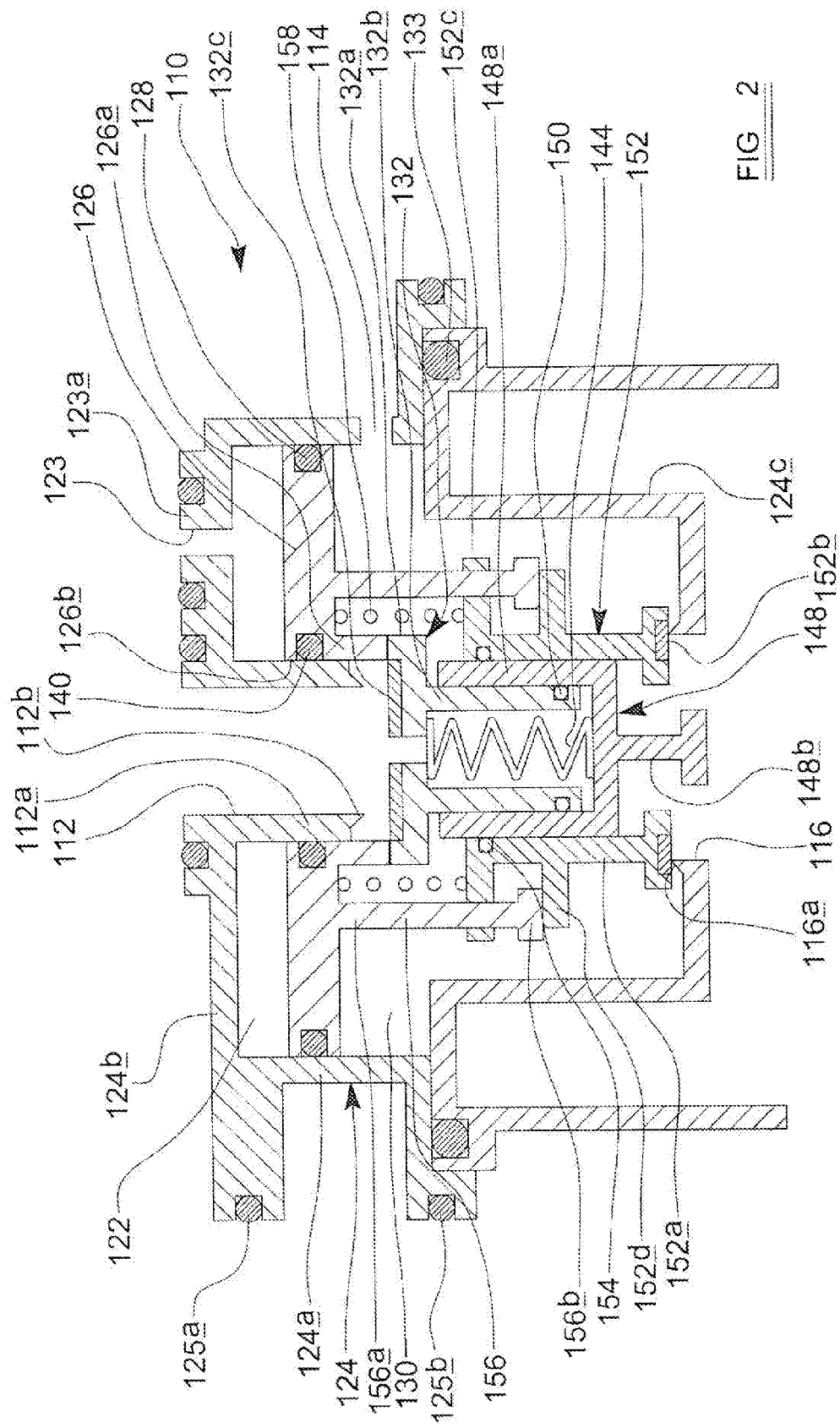
Figure 3:
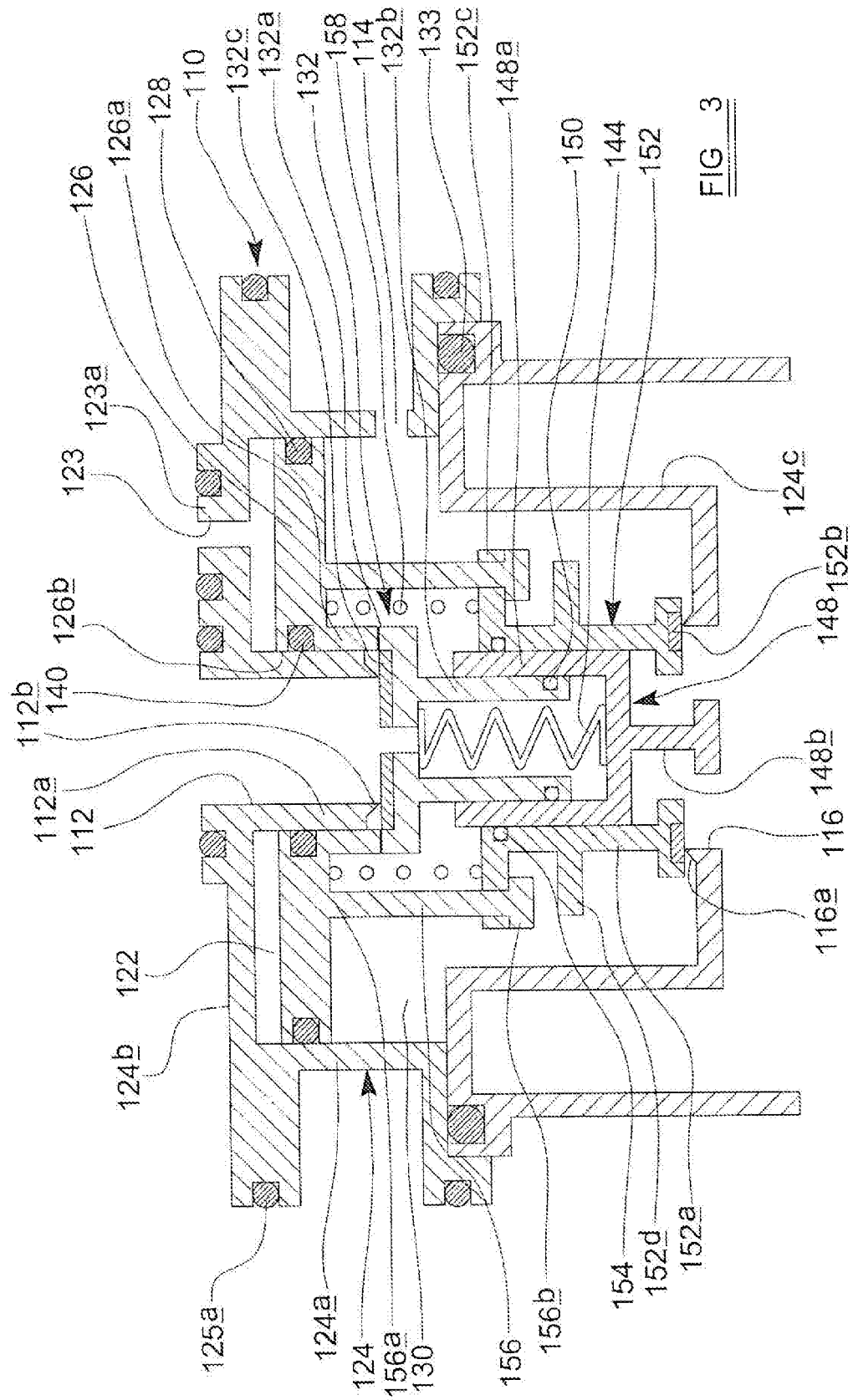
Figure 4:
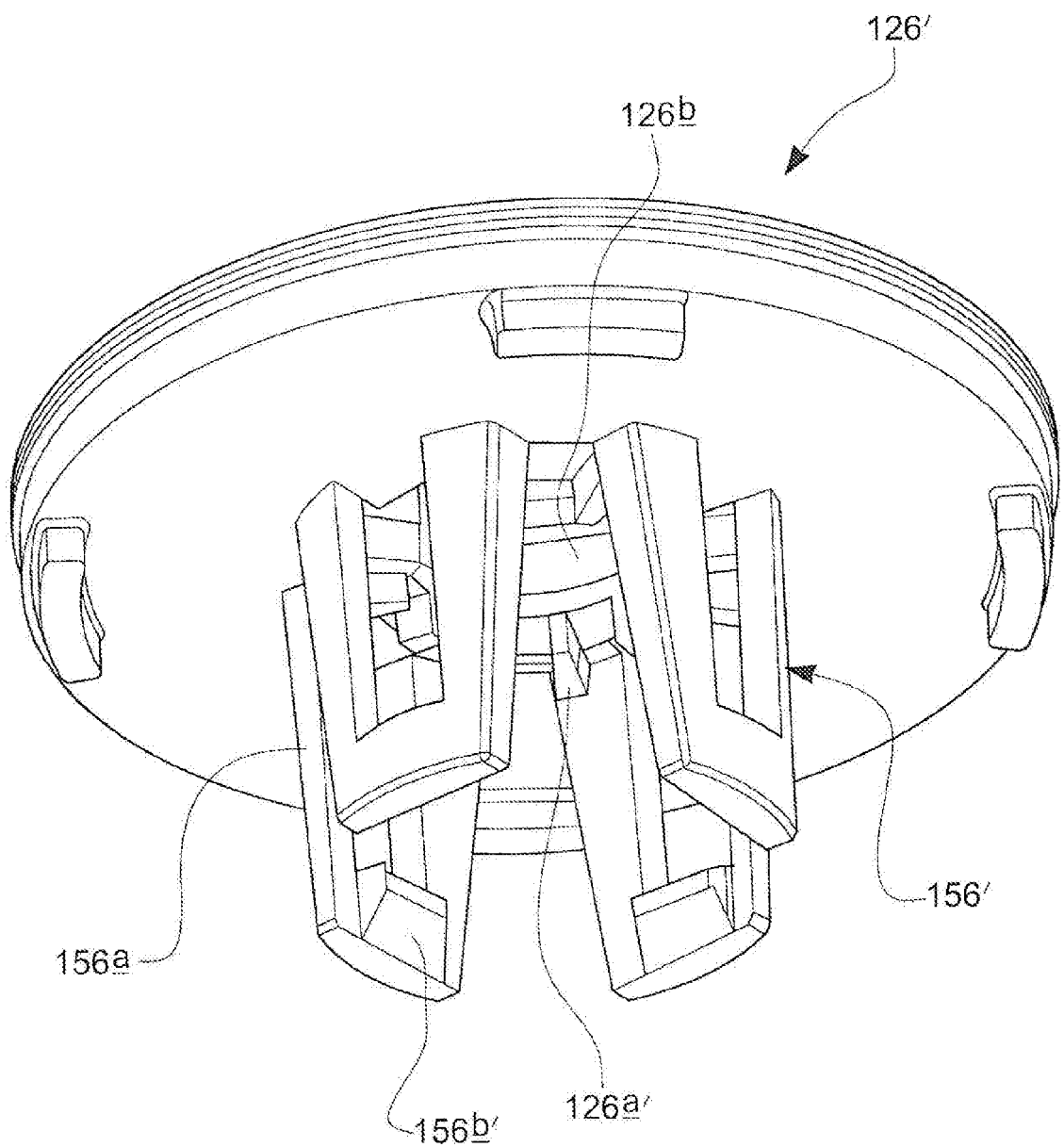
Figure 5:
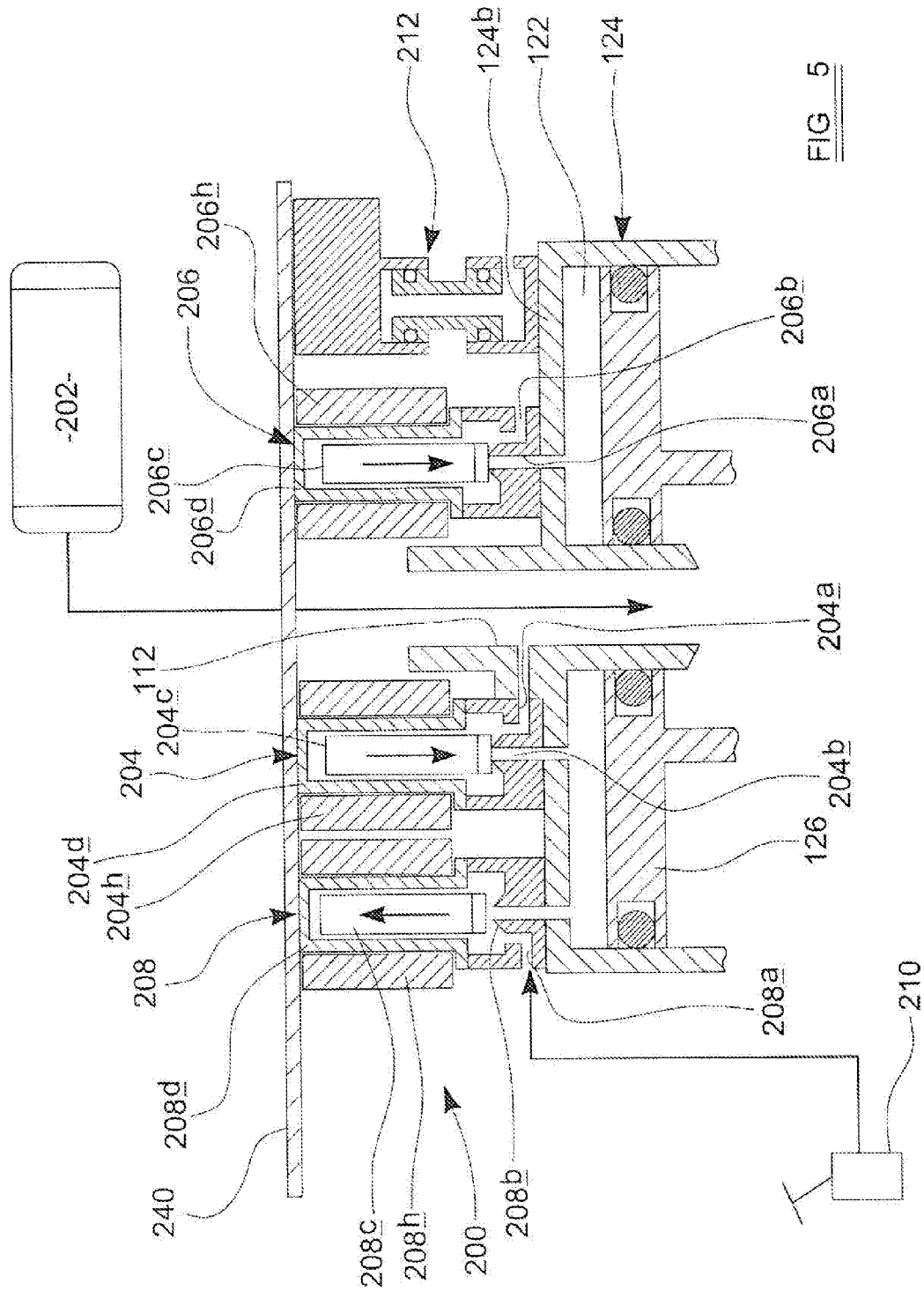
Figure 6A:
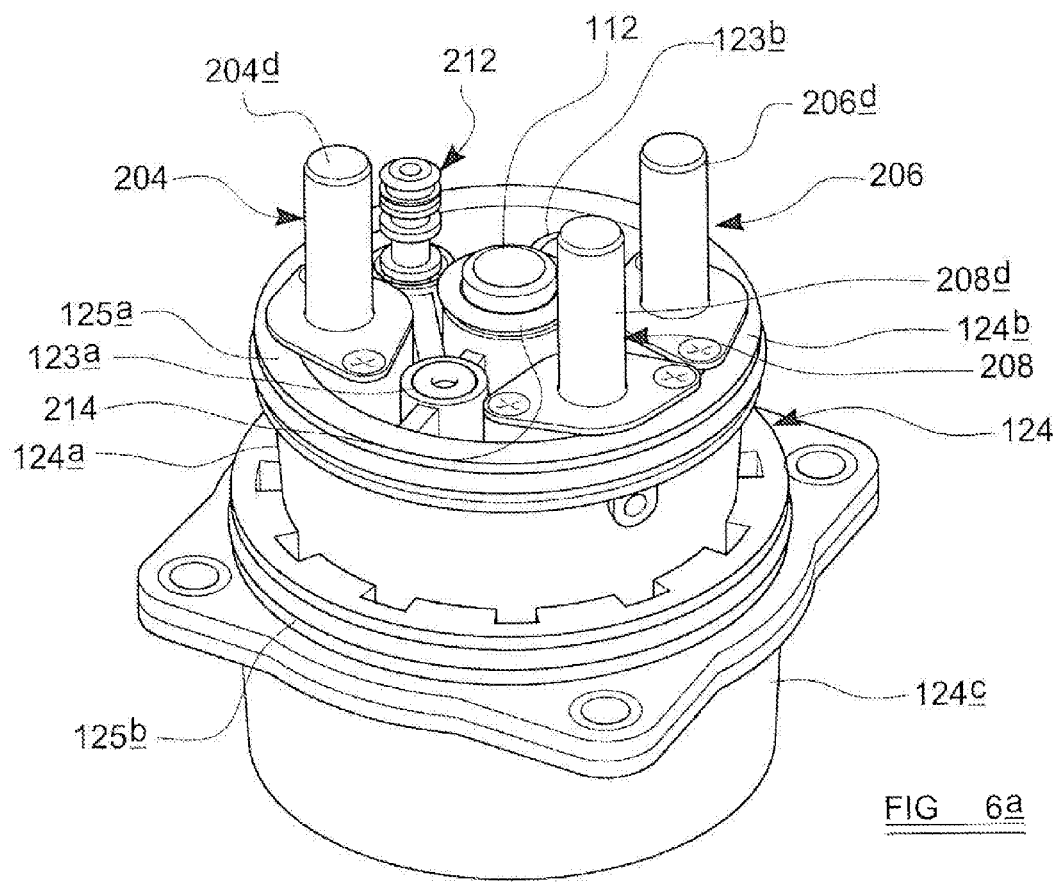
Figure 6B:
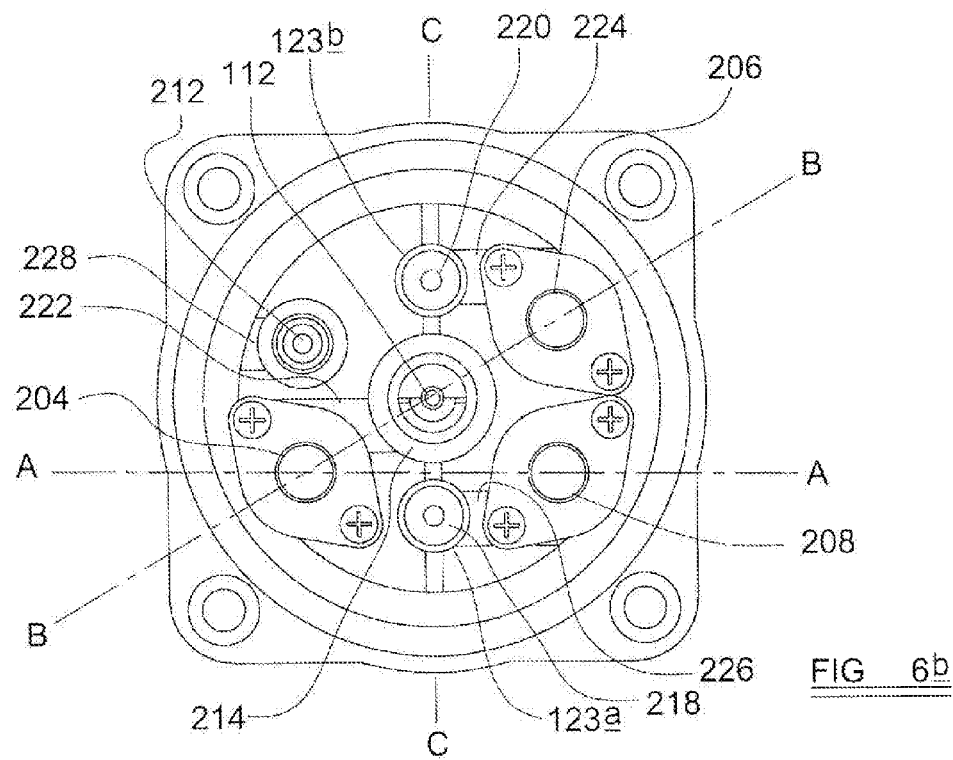
Figure 6C:
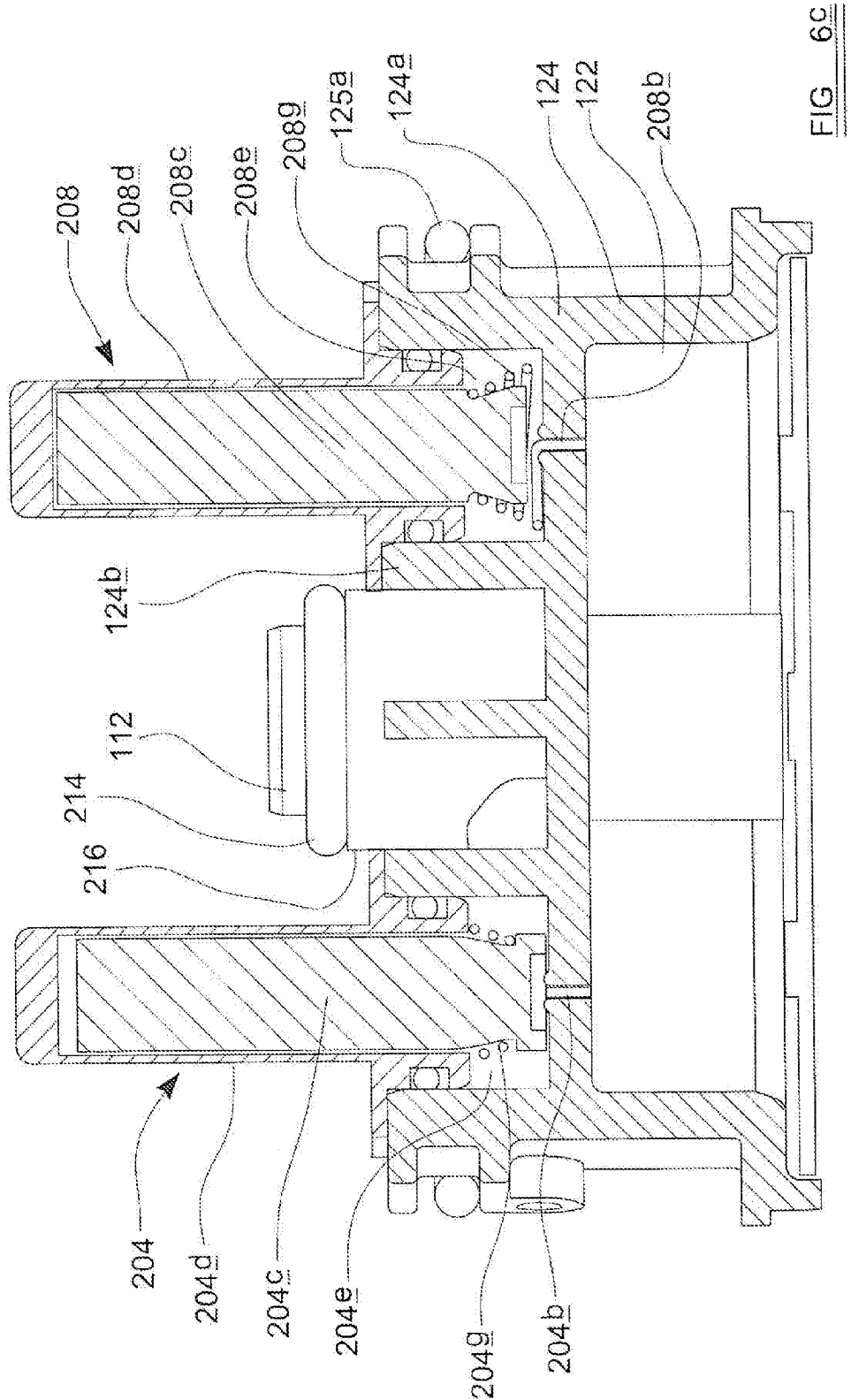
Figure 6D:
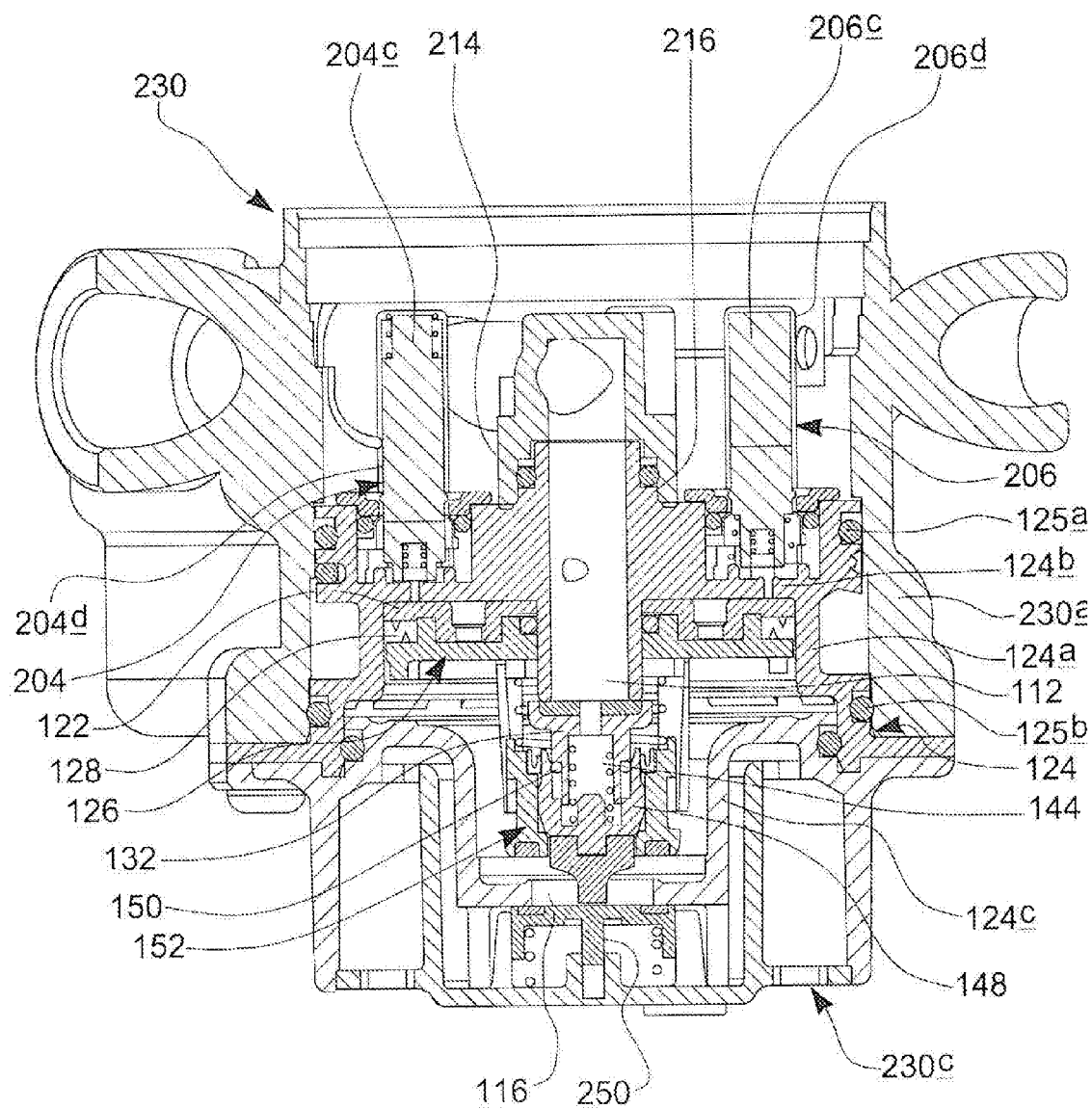
Figure 6E:
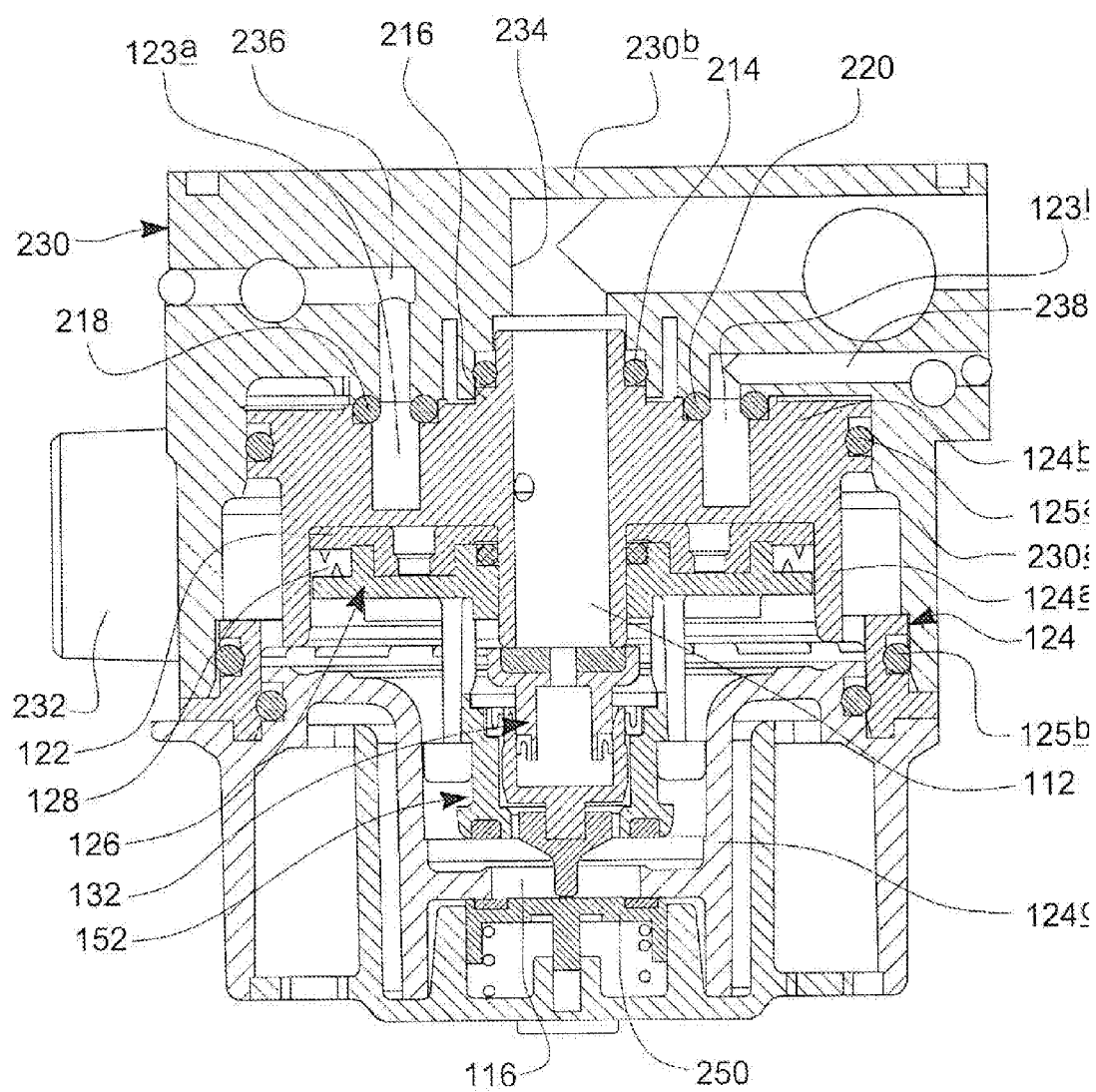
Figure 7A:
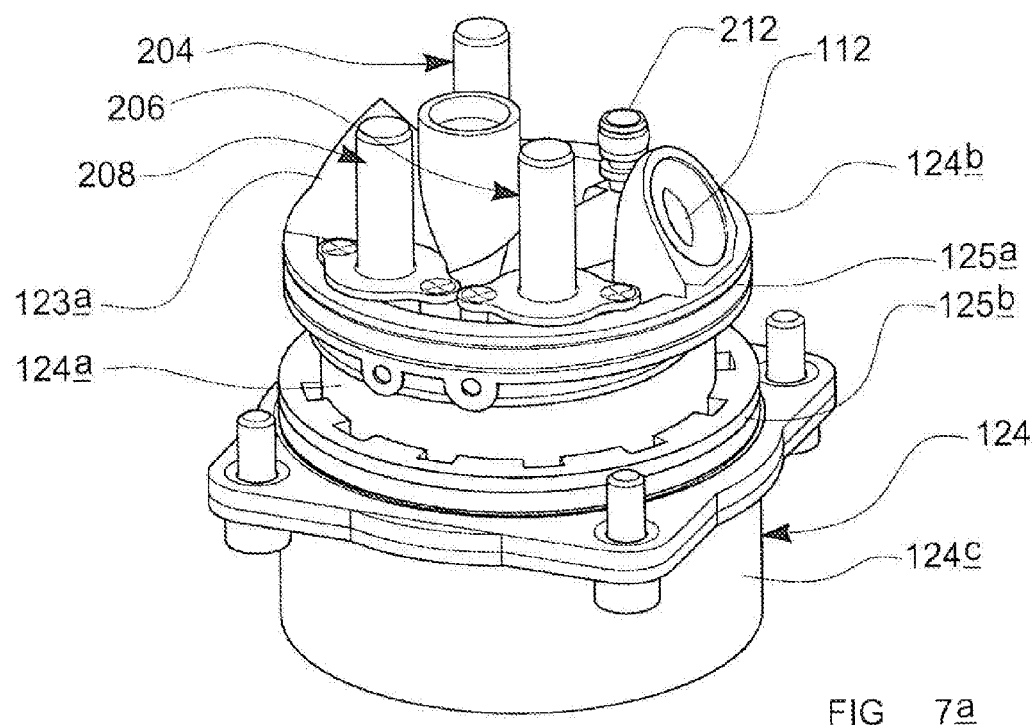

Embodiments of the invention will now be described with reference to the accompanying drawings of which, FIG. 1 is a schematic illustration of an embodiment of the inner housing and valve member assembly suitable for use in a valve assembly according to the invention, the valve member assembly being in the exhaust configuration, FIG. 2 is a schematic illustration of the portion of the valve assembly shown in FIG. 1 in the build configuration, FIG. 3 is a schematic illustration of the portion of the valve assembly shown in FIG. 1 in the hold or lapped configuration, FIG. 4 is a perspective view of an alternative configuration of the control piston suitable for use in a valve assembly according to the invention, FIG. 5 is a schematic illustration of one embodiment of the control valve assembly for a valve assembly according to the invention, FIG. 6a is a perspective view of the inner housing and control valve assembly of a first embodiment of the valve assembly according to the invention, FIG. 6b is a plan view of the inner housing and control valve assembly shown in FIG. 6a, FIG. 6c is a cross-sectional view through the inner housing and control valve assembly shown in FIGS. 6a and 6b along the line A in FIG. 6b, FIG. 6d is a cross-sectional view through a first embodiment of valve assembly in accordance with the invention including the valve member assembly, inner housing, control valve assembly shown in FIGS. 6a and 6b, and the outer housing, along the line B in FIG. 6b, FIG. 6e is a cross-sectional view through the first embodiment of valve assembly including the valve member assembly, inner housing and outer housing along the line C in FIG. 6b, FIG. 7a is a perspective view of the inner housing and control valve assembly of a second embodiment of valve assembly according to the invention.

Figure 7B:
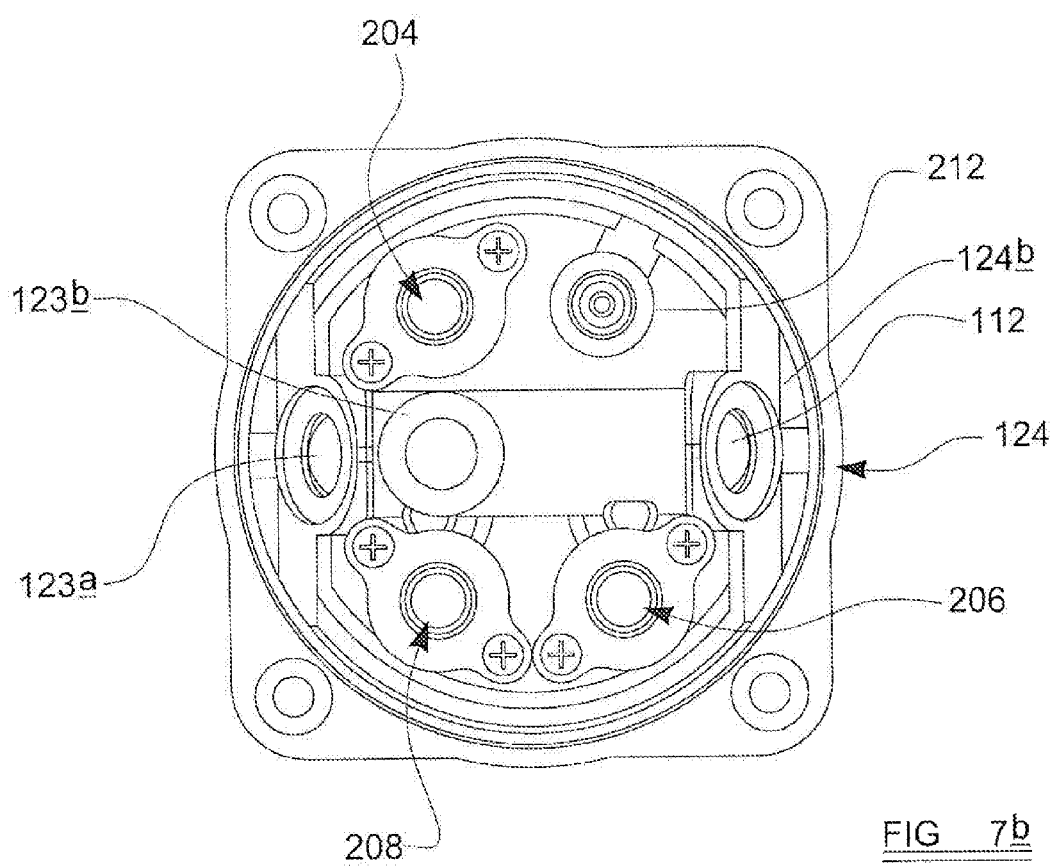
Figure 7C:
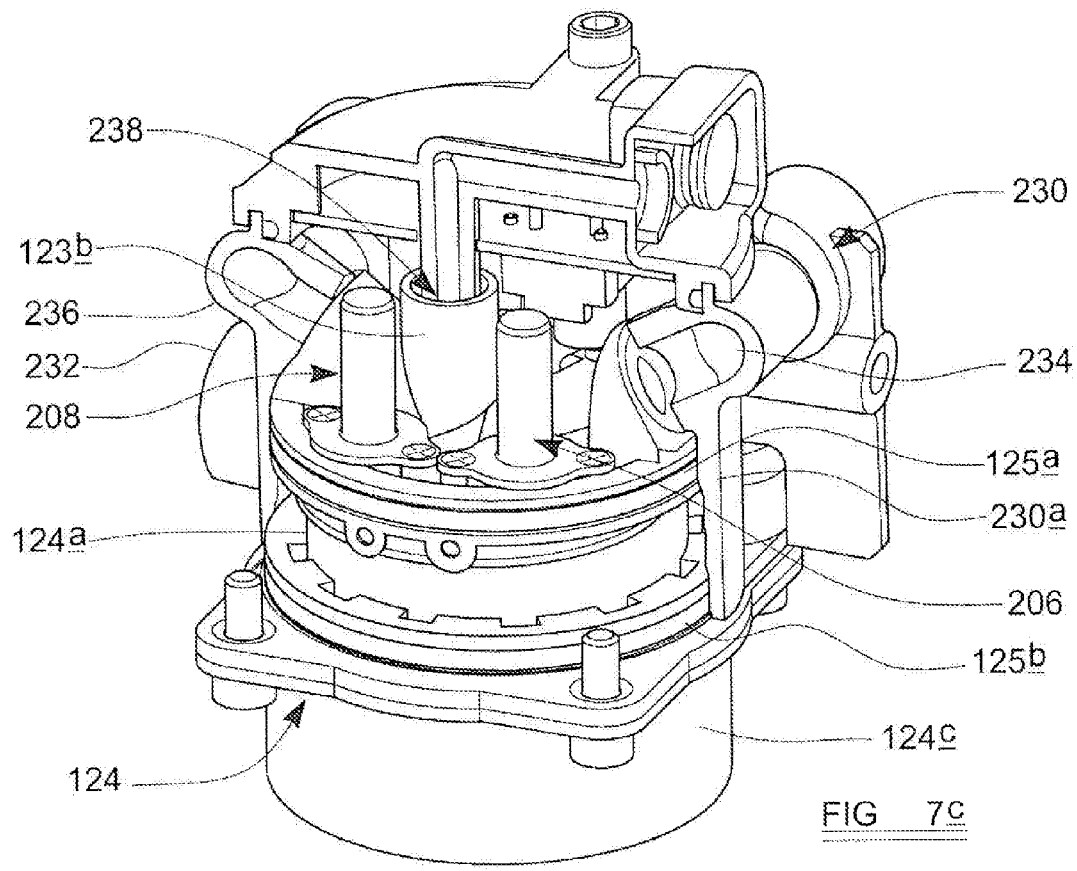
Figure 7D:
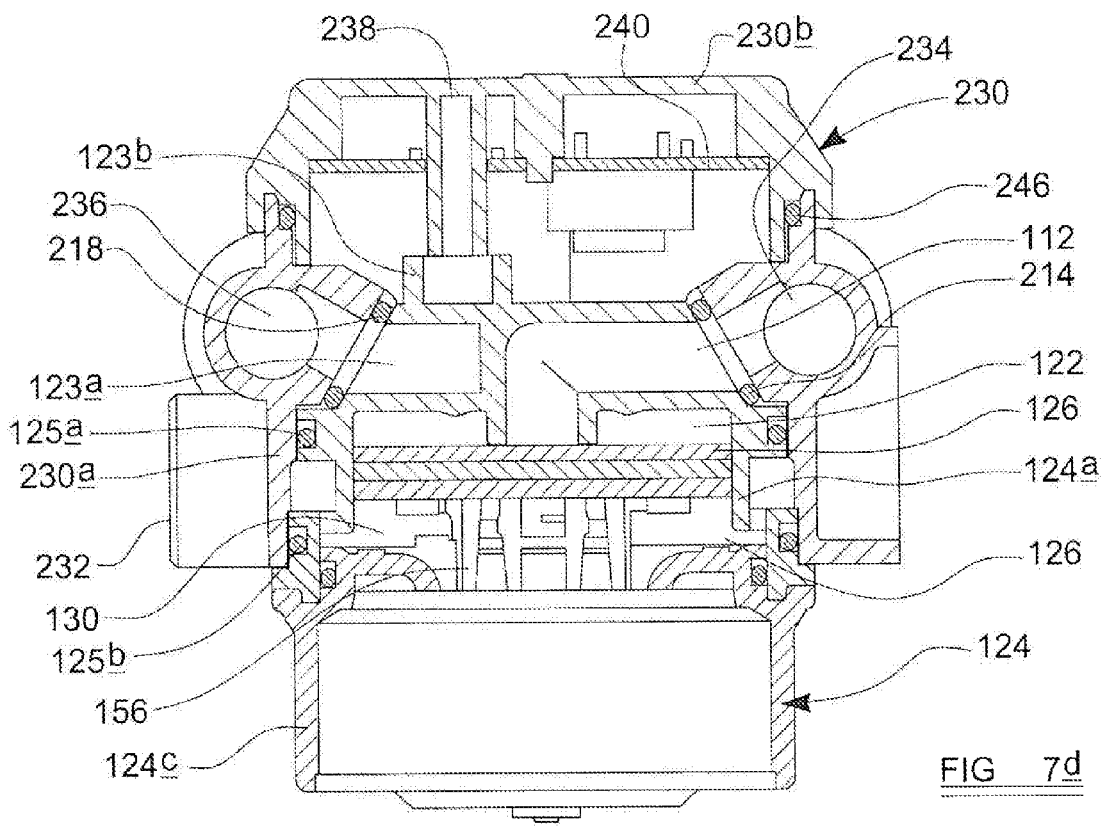
Figure 8A:
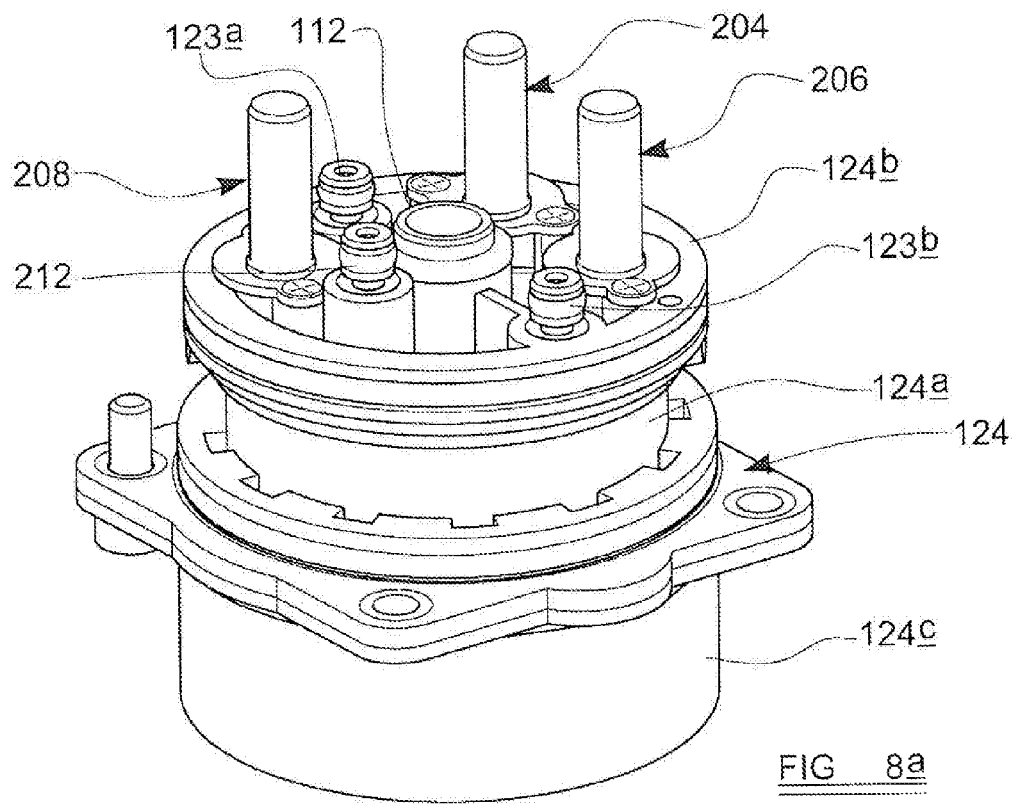
Figure 8B:
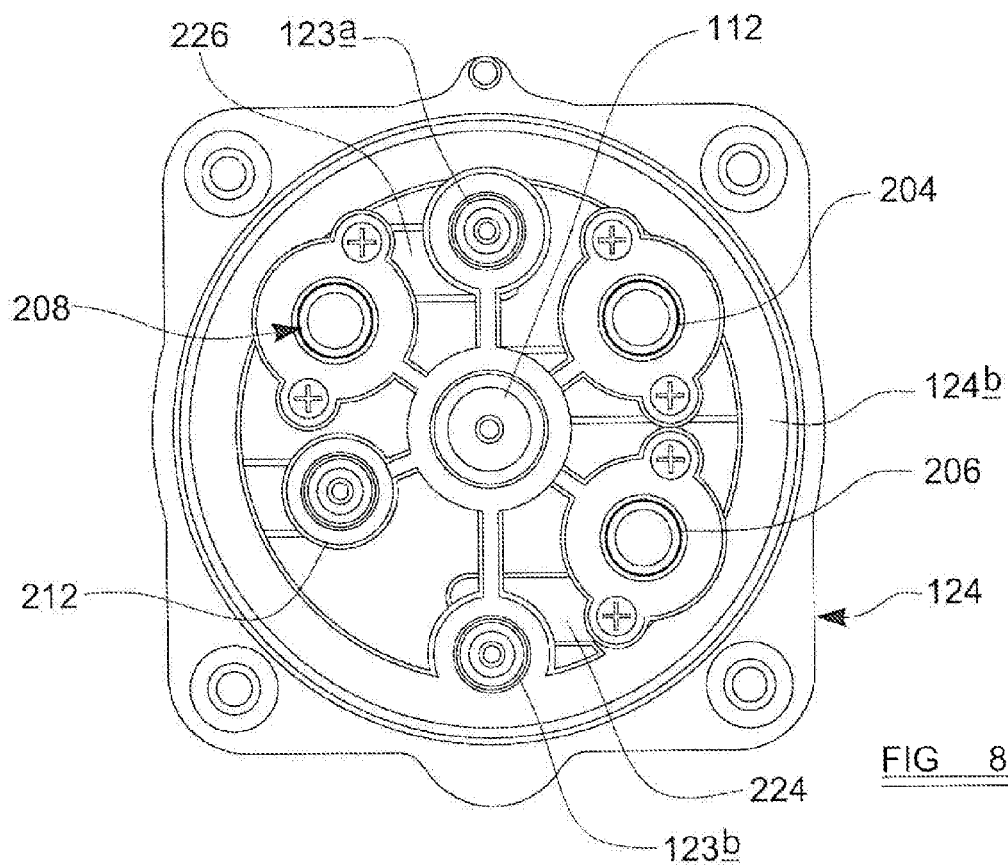
Figure 8C:
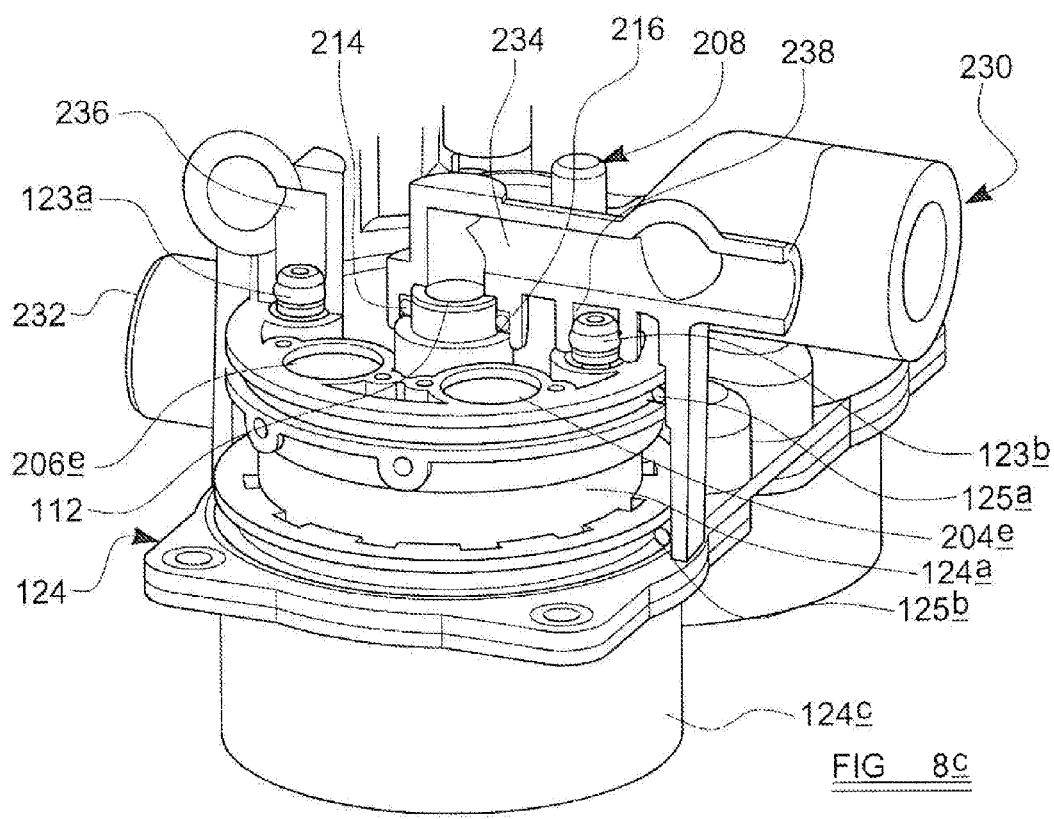
Figure 8D:
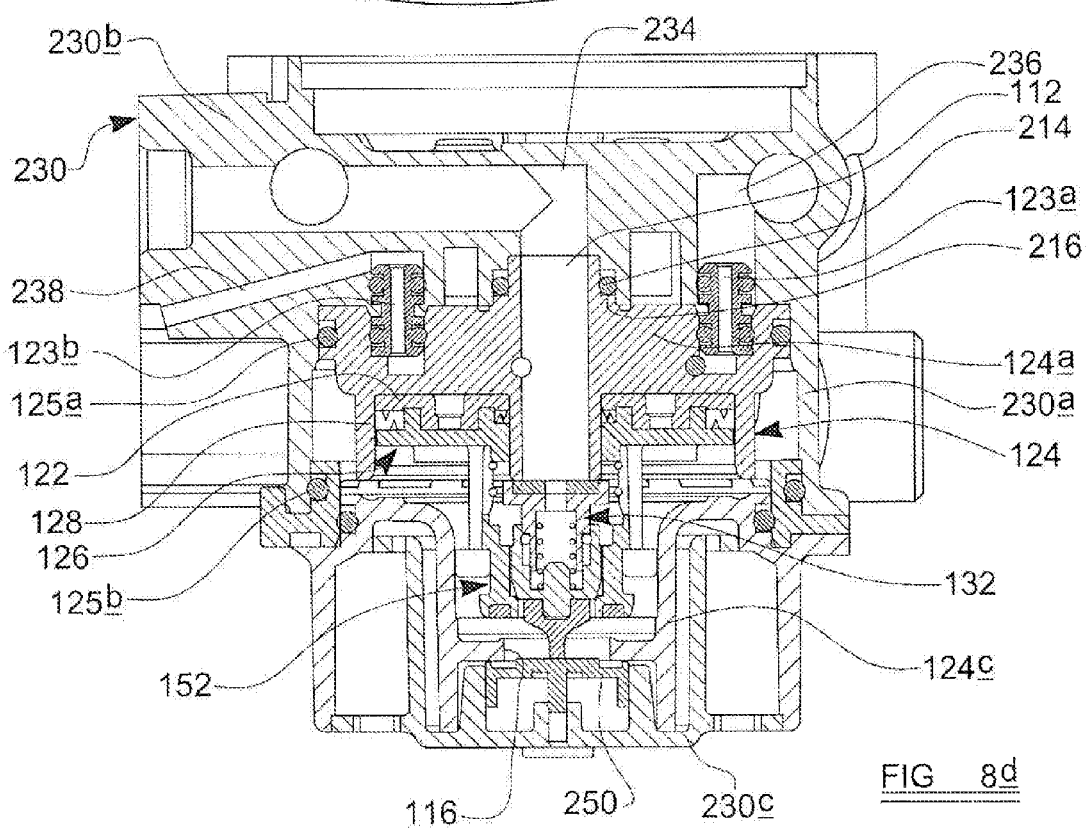
Figure 9:
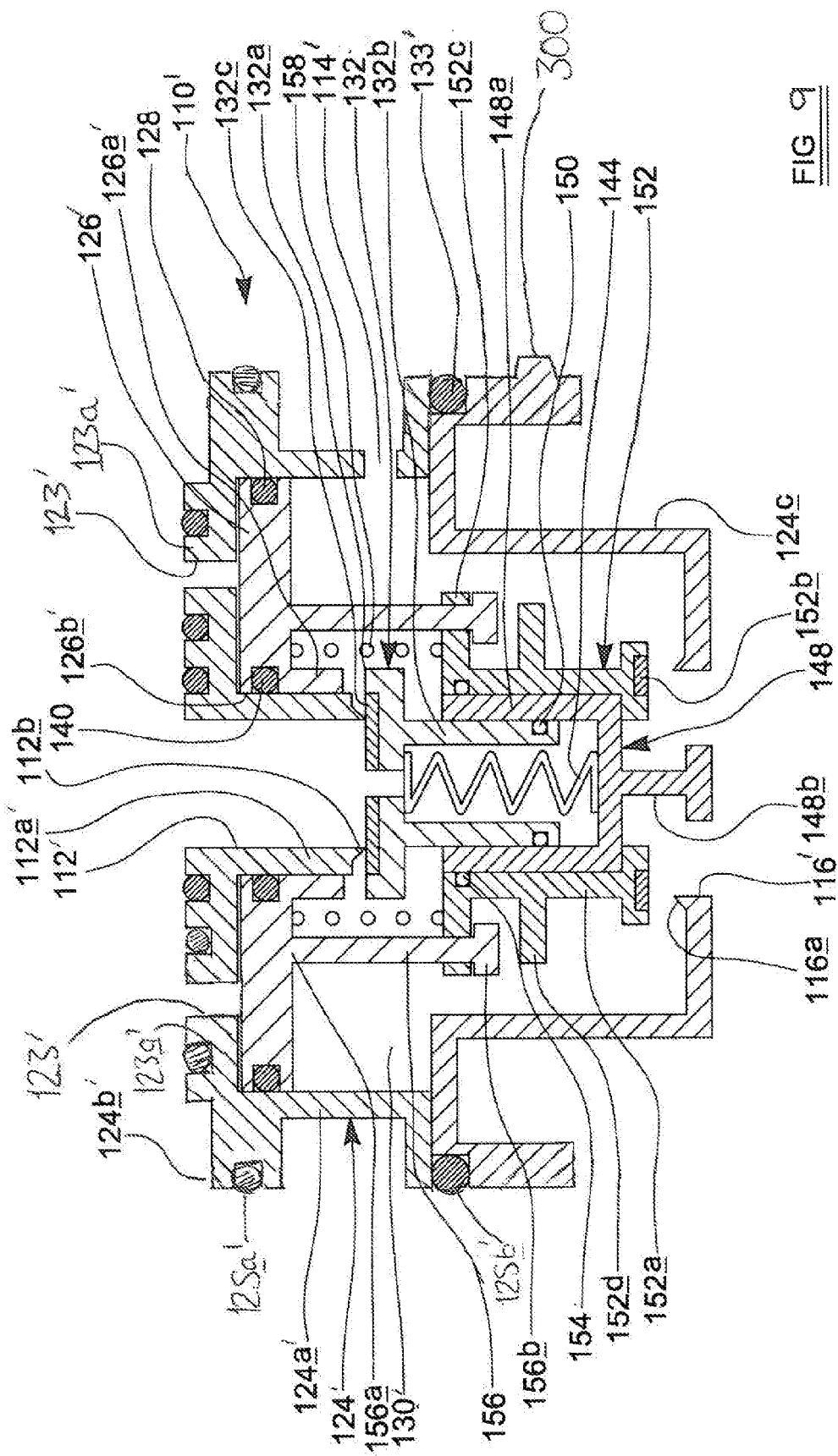
Figure 10:
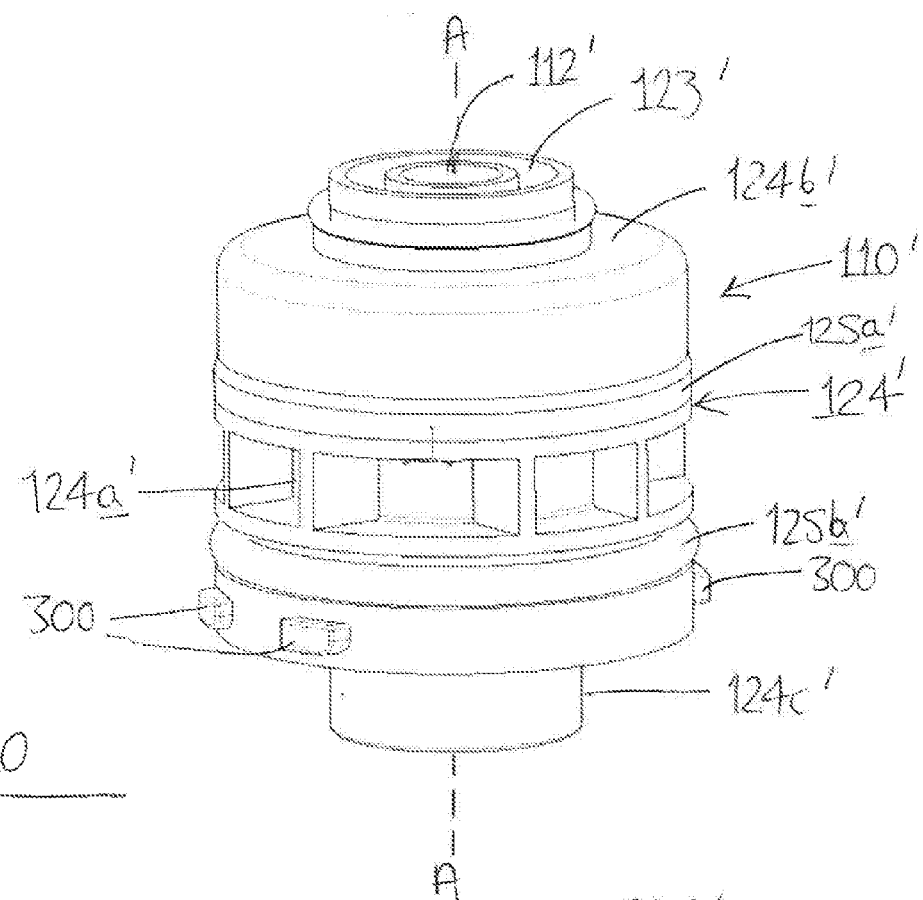
Figure 11A:
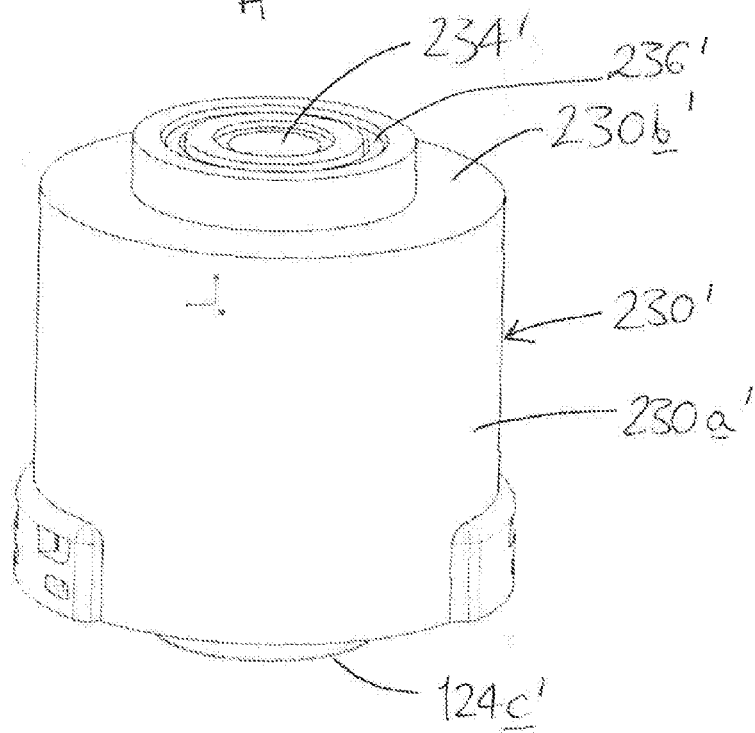
Figure 11B:
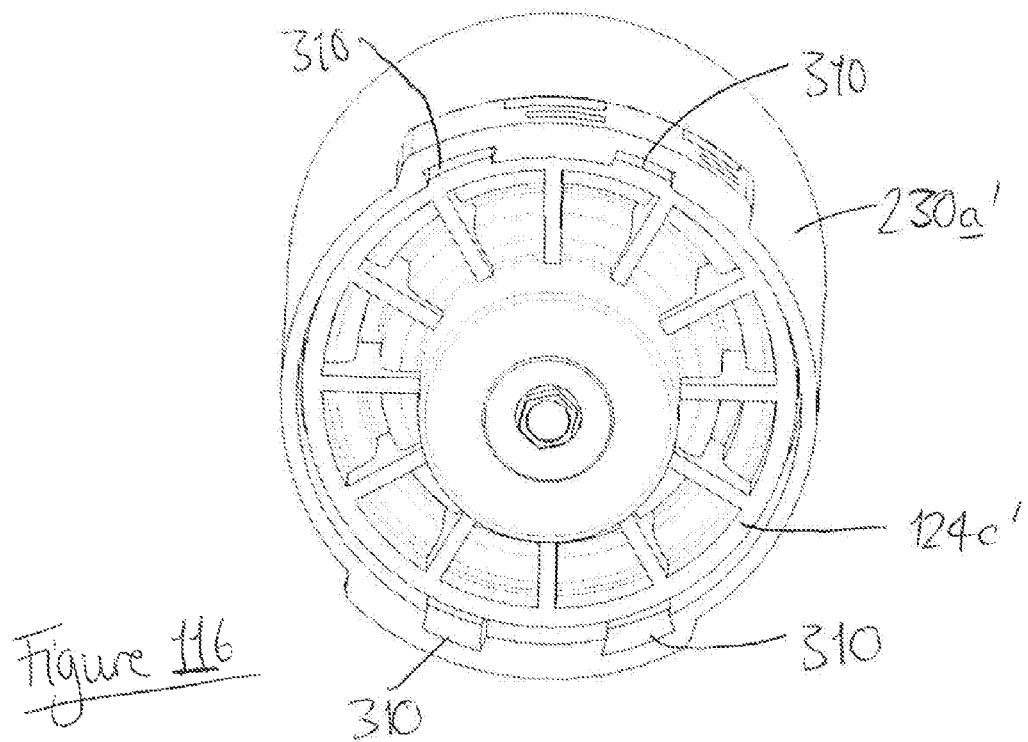
Figure 12:
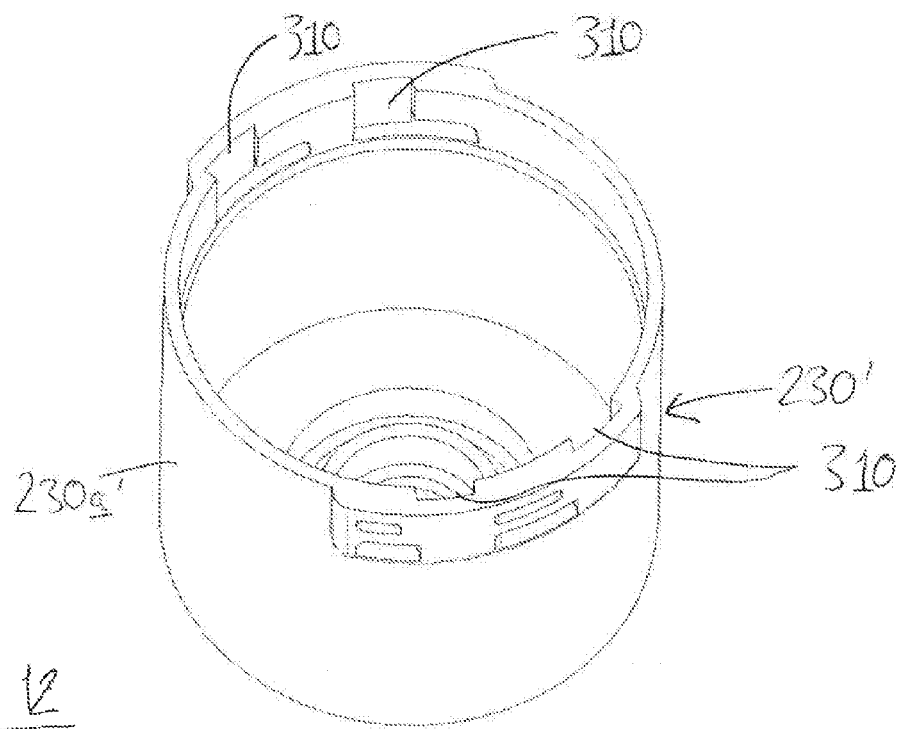
Figure 13:
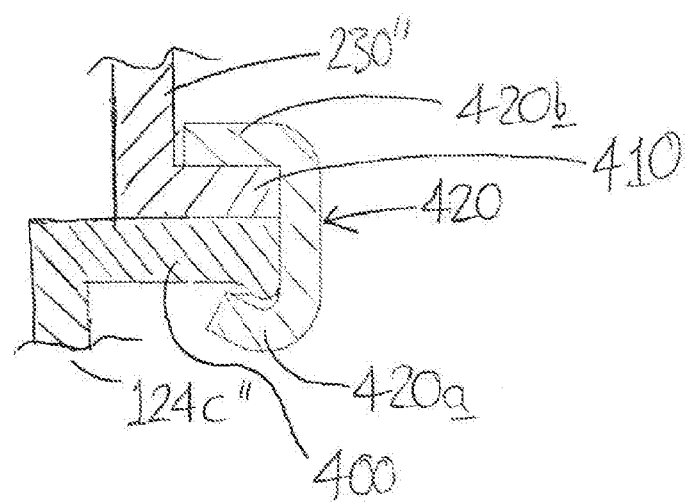

FIG. 7b is a plan view of the inner housing and control valve assembly shown in FIG. 7a, FIG. 7c is a part-cross-sectional perspective view through the inner housing and control valve assembly shown in FIGS. 7a and 7b along the line A in FIG. 7b, FIG. 7d is a cross-sectional view through the inner housing and control valve assembly shown in FIGS. 7a and 7b along the line A in FIG. 7b, FIG. 8a is a perspective view of the inner housing and control valve assembly of a third embodiment of valve assembly according to the invention, FIG. 8b is a plan view of the inner housing and control valve assembly shown in FIG. 8a, FIG. 8c is a part cross-sectional perspective view through the inner housing and control valve assembly shown in FIGS. 8a and 8b along the line A in FIG. 8b, FIG. 8d is a cross-sectional view through a first embodiment of the valve assembly in accordance with the invention including the valve member assembly, inner housing, control valve assembly shown in FIGS. 6a and 6b, and the outer housing, along the line B in FIG. 6b, FIG. 9 is a schematic illustration of an alternative embodiment of the inner housing and valve member assembly suitable for use in a valve assembly according to the invention, the valve member assembly being in the exhaust configuration, FIG. 10 is a perspective illustration of the alternative embodiment of the inner housing and valve member assembly illustrated schematically in FIG. 9, FIG. 11a is a perspective illustration of the inner housing and valve member assembly illustrated in FIGS. and 9 and 10 in an alternative embodiment of the outer housing, viewed from above, FIG. 11b is a perspective illustration of the inner housing and valve member assembly illustrated in FIGS. and 9 and 10 in the alternative embodiment of the outer housing, viewed from below, and FIG. 12 is a perspective illustration of the alternative embodiment of the outer housing illustrated in FIGS. 11a and 11b, FIG. 13 is an illustration of a partial cross-section through a further alternative embodiment of the outer housing.

Referring now to the figures, there is shown a valve assembly 110, comprising an inner housing 124 containing a valve member assembly, and being located, in part, within an outer housing 200.

One embodiment of the inner housing 124 and valve member assembly suitable for use in the invention is illustrated schematically in FIGS. 1 to 5, and together these are hereinafter referred to as a modulator 111. It should be appreciated, however, that other configurations of the modulator (such as those described in GB 2407131 or GB 2467957) could equally be used with an outer housing in accordance with the invention.

In this example, the inner housing 124 is generally cylindrical, and is provided with a first port, hereinafter referred to as the supply inlet 112, which is adapted to be connected to a source of pressurised fluid, typically a compressed air reservoir (not shown), a second port, hereinafter referred to as the delivery port 114, which is adapted to be connected to a fluid pressure operated brake actuator (not shown), and third port, hereinafter referred to as the exhaust outlet 116, which in this example vents to atmosphere. It will be appreciated that the exhaust outlet need not vent to atmosphere, and may instead be connected to an alternative low pressure volume which may be elsewhere in a vehicle braking system.

The modulator 111 is provided with a first movable member 126, hereinafter referred to as the control piston 126, which is movably mounted in the inner housing 124. It should be appreciated that the control piston 126 need not be a piston—it could, for example, be a diaphragm. In this example, the control piston 126 divides the inner housing 124 into two chambers—a control chamber 122 and a main chamber 130. The supply inlet 112, delivery port 114, and exhaust outlet 116 all provide access for fluid to flow into or out of the main chamber 130, whilst a control port 123 is provided in the inner housing 124 to provide fluid flow into or out of the control chamber 122.

In this example, the inner housing 124 has a generally cylindrical side wall 124a, a generally circular top face 124b which closes a first end of the side wall 124a, and an end cap 124c. In this example, the top face 124b is integral with the side wall 124a, whilst the end cap 124c is a separate component. A sealing element, in this example an O-ring 133, is located between the end cap 124c and the side wall 124a, the sealing element substantially preventing flow of fluid into or out of the inner housing 124 other than via one of the supply inlet 112, delivery port 114, exhaust outlet 116 or control port 123.

The exhaust outlet 116 is an aperture provided in the end cap 124c, whilst the supply inlet 112 and control port 123 are provided in the top face 124b of the inner housing 124. The main chamber 130 is, however, located between the control piston 126 and the end cap 124c, and therefore, the control chamber 122 is located between the control piston 126 and the supply inlet 112/delivery port 114. As such, in order for the supply inlet 112 to communicate with the main chamber 130 rather than the control chamber 122, a tubular extension 112a extends from around the aperture forming the supply inlet 112 into the control chamber 122, through a generally central aperture 126b provided in the control piston 126, and into the main chamber 130. A free end 112b of the tubular extension 112a is therefore located in the main chamber 130. A seal, in this example an O-ring 140, is provided in a groove in the control piston 126 around the aperture 126b, to provide a substantially fluid tight seal between the control piston 126 and the outer diameter of the tubular extension 112a. Thus, movement of the control piston 126 relative to the modulator inner housing 124 is permitted whilst maintaining separation of the fluid in the control chamber 122 from fluid in the main chamber 130.

The control chamber 122 is formed between the top face 124b of the inner housing 124 and the control piston 126, the O-ring 128 in the control piston 126 engaging with the side wall 124a of the inner housing 124. The side wall 124a of the inner housing 124 is provided with a delivery port 114 into the main chamber 130, this aperture therefore providing the delivery port 114. Two further sealing elements, in this example O-rings 125a & 125b, are mounted around the outer circumference of the side wall 124a of the inner housing, the delivery port 114 being located between the two sealing elements 125a, 125b.

A second movable member 132, hereinafter referred to as the reservoir valve 132, is provided in the main chamber 130. The reservoir valve 132 is provided with a generally circular seat part 132a which is biased into engagement with the free end of the tubular extension 112a surrounding the supply inlet 112, by means of a compression spring, hereinafter referred to as the reservoir spring 144.

The free end of the tubular extension 112a is provided with a valve 112b formation—in this example a generally circular ridge, for engagement with the reservoir valve 132. Moreover, an annular seat insert 132c, in this example made from a resilient rubber material, is provided in the seat part 132a. These assist in providing a fluid tight seal between the seat part 132a and the tubular extension 112a when the two are engaged, thereby closing the supply inlet 112. It will be appreciated, of course, that a resilient seat insert could be provided on the free end 112b of the tubular extension 112a, and the valve formation on the reservoir valve 132.

The reservoir valve 132 also includes a tubular locating part 132b which extends from the seat part 132a towards the end cap 124c of the inner housing 124. The locating part 132b surrounds a portion of the reservoir spring 144 and extends between the seat part 132a and a supporting part 148 of the end cap 124c. The supporting part 148 is goblet shaped, in that it comprises a cup part 148a which has a generally circular base and sidewall which encloses a generally cylindrical space, and a stem part 148b which extends between the base of the cup part 148a and the end cap 124c.

The stem part 148b of the supporting part 148 is connected to the remainder of the inner housing 124 by means of (in this example two radially opposing) struts (not shown) which extend from the area of the end cap 124c surrounding the exhaust outlet 116 to the base of the stem part 148b, thus supporting the stem part 148b generally centrally in the exhaust outlet 116, without impeding flow of fluid through the exhaust part to any significant degree.

The locating part 132b of the reservoir valve 132 extends into the cup part 148a of the supporting part 148, and has a seal 150 (again, in this example, an O-ring) provided around its outer surface. The O-ring 150 engages with the inner surface of the cup part 148a to provide a substantially fluid tight seal between the reservoir valve 132 and the end cap 124c whilst allowing the reservoir valve 132 to move against the biasing force of the reservoir spring 144 out of engagement with the tubular extension 112a around the supply inlet 112.

So as to prevent fluid pressure at the supply inlet 112 exerting a net force on the reservoir valve 132 tending to push the reservoir valve 132 against the biasing force of the reservoir spring 144 and out of engagement with the tubular extension 112a, the reservoir valve 132 is provided with a through-bore which extends from a generally central portion of the seat part 132a enclosed by the seat insert 132c and connects the supply inlet 112 with the volume enclosed by the locating part 132b and the cup part 148a of the supporting part 148. Two sides of the reservoir valve 132 are therefore exposed to the fluid at the supply inlet. 112—the uppermost side of the seat part 132a and the lowermost side of the seat part 132a and locating part 132b.

Moreover, the diameter of the valve formation 112b is substantially equal to the inner diameter of the cup part 148a of the supporting part 148. As such the area enclosed by the points of contact between the valve formation 112b and the seat insert 132c and the area enclosed by the points of contact between the O-ring 150 and the supporting part 148 are substantially equal. This ensures that, when the reservoir valve 132 is engaged with the tubular extension 112a, the two sides of the reservoir valve 132 exposed to the supply inlet fluid pressure are substantially equal in area, and the supply inlet fluid pressure exerts negligible net force on the reservoir valve 132.

The control piston 126 is provided with a plurality of castellations 126a which are spaced around the generally central aperture 126b and extends towards the reservoir valve 132. It will be appreciated that engagement of the castellations 126a with the reservoir valve 132 sets a minimum spacing between the control piston 126 and the reservoir valve 132.

The modulator 111 is also provided with a third movable member 152, hereinafter referred to as the exhaust valve 152. The exhaust valve 152 has a tubular body 152a which surrounds the cup part 148a of the supporting part 148. A seal 154, in this example an O-ring, is located in a groove around the radially inward facing surface of the tubular body 152a and provides a substantially fluid tight seal between the exhaust valve 152 and the outer surface of the cup part 148a of the supporting part 148, whilst allowing the exhaust valve 152 to slide longitudinally relative to the supporting part 148.

At the end of the tubular body 152a adjacent the end cap 124c, there is provided a radially outwardly and inwardly extending flange part which provides support for an exhaust seat insert 152b. Preferably, the exhaust seat insert 152b is made from a resilient material such as rubber. The exhaust valve 152 is movable relative to the inner housing 124 to bring the exhaust seat insert 152b into and out of engagement with a valve formation, which comprises a generally circular ridge 116a which extends into the main chamber 130 from the portion of the end cap 124c surrounding the exhaust outlet 116. Engagement of the exhaust valve 152 with the end cap 116 in this way substantially prevents flow of fluid through the exhaust outlet 116. It will be appreciated, of course, that a resilient seat insert may be provided on the end cap 124c of the inner housing 124 around the exhaust port 116, and the valve formation on the exhaust valve 152.

A mechanical link is provided between the control piston 126 and the exhaust valve 152. In this example, the link comprises a plurality of connecting rods 156 which extend from the control piston 126 into the main chamber 130 to the exhaust valve 152.

The other end of the tubular body 152a of the exhaust valve 152, i.e. the end adjacent the control piston 126, is provided with a radially outwardly extending connection flange 152c. A series of apertures are provided in this connection flange 152c, generally equally spaced around the circumference of the tubular body 152a. Through each of these apertures extends a connecting rod 156. Each connecting rod 156 has a first end 156a which is secured to the control piston 126, and a second end which is provided with a stop part 156b which extends generally perpendicular to the longitudinal axis of the connecting rod 156. It will be appreciated that, to simplify manufacture of the modulator 111, the connecting rods 156 cannot be integral with the control piston 126, and advantageously either the connecting rods 156 are fastened to the control piston, or the stop part 156b is fastened to the connecting rods 156.

The exhaust valve 152 is also provided with a stop part 152d which comprises a flange which extends radially outwardly from the tubular body 152a and which is located between the exhaust seat insert 152b and the connection flange 152c. The connecting rods 156 can slide in the apertures, and therefore movement of the control piston 126 relative to the exhaust valve 152 is permitted, but it will be appreciated that engagement of the stop parts 156b of the connecting rods 156 with the connection flange 152c sets a maximum spacing between the control piston 126 and the exhaust valve 152, and engagement of the stop parts 156b of the connecting rods 156 with the stop part 152d of the exhaust valve 152 sets a minimum spacing between the control piston 126 and the exhaust valve 152.

An alternative configuration of this link is illustrated in FIG. 4, which shows a perspective view of an alternative embodiment of the control piston 126' from the main chamber side of the piston. In this version, the link is provided by four U-shaped legs 156', the base part of which is provided with a radially inwardly extending lip formation 156b'. In this case, the connection flange 152c of the exhaust valve 152 is not provided with a series of apertures, and the legs 156' lie radially outwardly of the connection flange 152c with the lip formation 156b' extending into the space between the connection flange 152c and the stop part 152d. Advantageously, the legs 156' are sufficiently flexible and resilient that, during assembly of the modulator 111, the legs 156' may be bent slightly to force the lip formations 156b' over the connection flange 152c until the lip formation 158b' snaps into place in the space between the connection flange 152c and the stop part 152d.

It should be appreciated that, whilst in these embodiments of the invention the link between the control piston 126 and the exhaust valve 152 comprises a longitudinal element—the connecting rods 156 or legs 156', which is fixed to the control piston 128, and radially outwardly extending flanges which are provided on the exhaust valve and form the stop parts 152d and 156b, the longitudinal link element may be provided on the exhaust valve 152 and the stops on the control piston 126.

The diameter of the valve formation 116a surrounding the exhaust outlet 116 which engages with the exhaust seat insert 152b is deliberately selected to be greater than the diameter of the cylindrical space enclosed by the tubular body 152a of the exhaust valve 152. This means that, the area enclosed by the points of contact between the exhaust valve formation 116a and the exhaust seat insert 152b is greater than the area enclosed by the points of contact between the O-ring 154 and the cup part 148a of the supporting part 148. As such, when the exhaust valve 152 is engaged with this ridge, the fluid pressure in the main chamber 130 exerts a net force on the exhaust valve 152 which pushes the exhaust valve 152 into engagement with the exhaust valve formation 116a.

In one embodiment of the invention, the difference in diameter is selected so that the force pushing the exhaust valve 152 into engagement with the end cap 124c of the inner housing 124 (i.e. the exhaust seat energisation) is around 1 N/mm when the pressure in the main chamber is 10 bar. It will be appreciated, however, that this difference can be tailored to give whatever seat energisation is required—either higher or lower, without having any effect on the cracking pressure of the modulator 111.

A spring 158 is provided between the control piston 126 and the exhaust valve 152. This spring, hereinafter referred to as the exhaust spring 158, is, in this example, a helical compression spring, extends from the control piston 126 to the connection flange 152c of the exhaust valve 152, and is located radially inwardly of the connecting rods 156, around the tubular extension 112a and a portion of the reservoir valve 132.

Flow of fluid between the supply inlet 112, the delivery port 114 and the exhaust port 116 is controlled by movement of the control piston 126 under the influence of fluid pressure in the control chamber 122, as in prior art modulators. In this example, a conventional electrically operated control valve assembly 200, comprising three solenoid operated valves is provided to control flow of pressurised fluid into the control chamber 122. For simplicity, in FIGS. 1, 2 and 3, only one inlet for supply of fluid to and from the control chamber 122 is shown—the control port 123 in the top face 124b of the inner housing 124, and the control valve assembly 200 has been omitted. The preferred embodiment of the invention is slightly more complex than this, however, and requires at least two ports into the control chamber 122.

FIG. 5 is a schematic illustration of the preferred embodiment of control valve assembly 200. This shows a portion of the modulator 111 including the top face 124b of the inner housing 124, the supply inlet 112 and its connection to a reservoir of pressurised fluid 202, and the control piston 126. It also shows a first solenoid operated valve 204, hereinafter referred to as the hold valve 204, a second solenoid operated valve 206, hereinafter referred to as the dump valve 206, and a third solenoid operated valve 208, hereinafter referred to as the pneumatic back-up valve 208.

Each of these valves 204, 206, 208 has an inlet 204a, 206a, 208a, an outlet 204b, 206b, 208b and a valve member 204c, 206c, 208c. Each valve member 204c, 206c, 208c is mounted in a cylindrical support housing 204d, 206d, 208d and is movable between an open position in which flow of fluid between the inlet 204a, 206a, 208a and the outlet 204b, 206b, 208b is permitted, and a closed position in which flow of fluid between the inlet 204a, 206a, 208a and the outlet 204b, 206b, 208b is substantially prevented. Each valve 204, 206, 208 is provided with a biasing means such as a helical spring (not shown) which, in the case of the hold and dump valves 204, 206, biases the valve member 204c, 206c into the closed position, and which, in the case of the pneumatic back-up valve 208, biases the valve member 208c into the open position.

Each valve 204, 206, 208 is also provided with a solenoid 204h, 206h, 208h which is mounted around the circumference of the support housing 204d, 206d, 208d, and each valve member 204c, 206c, 208c is constructed such that passage of an electrical current through the solenoid 204h, 206h, 208h causes the valve member 204c, 206c, 208c to move against the biasing force of the spring to the open position in the case of the hold and dump valves 204, 206 and to the closed position in the case of the pneumatic back-up valve 208. The flow of electrical current to the solenoids 204h, 206h, 208h is typically controlled by an electronic braking control unit.

The inlet 206a of the dump valve 206 is connected to the control chamber 122 via the control port 123, as are the outlets 204b, 208b of the hold valve 204 and the pneumatic back-up valve 208. The inlet 204a of the hold valve 204 is connected to the pressurised fluid reservoir 202 via the supply inlet 112, the inlet 208a of the pneumatic back-up valve 208 is connected to a fluid flow line carrying a fluid pressure braking signal from a brake pedal 210, and the outlet 206b of the dump valve 206 vents to a low pressure region, typically atmosphere.

The modulator 111 operates as follows.

When electronic braking control is demanded, the pneumatic back-up valve 208 is closed, by the supply of electrical current to the solenoid of this valve 208.

When there is no braking demand, the modulator 111 adopts the exhaust configuration as illustrated in FIG. 1. An electrical current is supplied to the solenoid of the dump valve 206, but not to the hold valve 204. The hold valve 204 is therefore closed. The control chamber 122 is thus vented to atmosphere, and the control piston 126 is located such that the volume of the control chamber 122 is at a minimum. The reservoir seat part 132a is engaged with the tubular extension 112a of the supply inlet 112 so that flow of fluid from the supply inlet 112 into the main chamber 130 is substantially prevented, and the exhaust seat insert 152b is spaced from the end cap 124c of the inner housing 124 such that flow of fluid from the delivery port 114 to the exhaust outlet 116 is permitted.

When a braking demand signal is received, an electrical current is supplied to the solenoid of the hold valve 204, but not the dump valve 206. The hold valve 204 thus directs pressurised fluid from the reservoir 202 to the control chamber 122 via the control port 123 and control inlet 123a. The control piston 126 is acted on by the increasing pressure in the control chamber 122 and is pushed towards the reservoir valve 132 and the exhaust valve 152. The force from the pressure in the control chamber 122 is transmitted to the exhaust valve 152 via the exhaust spring 158, and as the control piston 126 moves to increase the volume of the control chamber 122, the exhaust valve 152 moves with it, until the exhaust seat insert 152b engages with the ridge around the exhaust outlet 116. Fluid flow through the exhaust outlet is thus substantially prevented.

As the pressure in the control chamber 122 increases further, the exhaust spring 158 is compressed as the control piston 126 continues to move to further increase the volume of the control chamber 122. The castellations 126a on the control piston 126 then engage with the reservoir valve 132 and push the reservoir seat part 132a out of engagement with the tubular extension 112a so that flow of fluid through the supply inlet 112 to the main chamber 130 and then to the delivery port 114 is permitted. The stop parts 156b on the connecting rods 156 then engage with the stop part 152d on the exhaust valve 152 to bring movement of the control piston 126 to a stop. The modulator is then in the build configuration as illustrated in FIG. 2.

It will be appreciated that the height of the castellations 126a is selected to ensure that the exhaust valve 152 is engaged with the end cap 124c of the inner housing 124, thus closing the exhaust outlet 116, before the castellations 126a engage with the reservoir valve 132. If this was not the case, the supply inlet 112 and the exhaust port 116 would be open at the same time, which would result in venting of the pressurised fluid supply to the atmosphere. Similarly, it will be appreciated that the separation of the stop part 152d and connection flange 152c of the exhaust valve 152 is selected such that the stop parts 156b of the connecting rods 156 do not engage with the stop part 152d of the exhaust valve 152 until the control piston 126 has pushed the reservoir valve 132 far enough away from the tubular extension 112a to ensure substantially unimpeded flow of fluid through the supply inlet 112.

If the exhaust valve 152 should stick, so that, as the pressure in the control chamber 122 builds, it doesn't move and, instead, the exhaust spring 158 is compressed, it is possible that the castellations 126a could engage with the reservoir valve 132 to open the supply inlet 112 whilst the exhaust port 116 is still open. The stop part 152d on the exhaust valve 152 mitigates this problem, because, as the exhaust spring 158 is compressed, the stop parts 156b of the connecting rods 156 engage with the stop part 152d of the exhaust valve 152 when the supply inlet 112 is partially open. This either forces the exhaust valve 152 to move to close the exhaust outlet 116, or prevents further movement of the control piston 126 and the supply inlet 112 being fully opened.

In order to move the modulator 111 to the hold configuration illustrated in FIG. 3, in which both the exhaust outlet 116 and the supply inlet 112 are closed, electrical current is supplied to neither the hold valve 204 or the dump valve 206. Flow of pressurised fluid into the control chamber 122 is stopped, and the control chamber 122 is closed. As fluid continues to flow through the supply inlet 112 to the delivery outlet 114, fluid pressure in the main chamber 130 increases, and acts on the control piston 126 pushing it to reduce the volume of the control chamber 122. The reservoir valve 132 is therefore free to move towards the control piston 126 under the action of the reservoir spring 144, until the annual seat insert 132c engages with the tubular extension 112a to close the supply inlet 112 again. As this stops the flow of pressurised fluid into the main chamber 130, movement of the control piston 126 stops at an equilibrium position when the force exerted on the control piston 126 by fluid pressure in the control chamber 122 balances the force exerted by fluid pressure in the main chamber 130.

The modulator 111 is returned to the exhaust configuration by the supply of an electrical current to the dump valve 206 to vent the control chamber 122 to atmosphere. The control piston 126 is then able to move under the influence of the fluid pressure in the main chamber 130 to minimise the volume of the control chamber 122, and engagement of the stop parts 156b of the connecting rods 156 with the connection flange 152c of the exhaust valve 152 causes the exhaust valve 152 to be pulled out of engagement with the end cap 124c of the inner housing 124, and therefore the exhaust port 116 opened.

The pneumatic back-up valve 208 only opens if the electrical power supply to the braking system fails, and electronic braking control is no longer available. In the absence of an electrical current, the pneumatic back-up valve 208 automatically opens, and connects the control chamber 122 to the fluid pressure braking signal. The control piston 126 then moves under the influence of the fluid pressure braking control signal.

As mentioned above, in order to simplify the above explanation of the construction and operation of the modulator 111, the schematic illustrations in FIGS. 1, 2, 3, and 5 show a simplified arrangement of the control valve assembly 200, pressure transducer port 212 and control port 123. In a first embodiment of the invention, these parts are arranged as illustrated in FIGS. 6a, 6b, 6c, and 6d.

Referring now to FIGS. 6a to 6e, these show the inner housing 124 with the support housings 204d, 206d, 208d of the hold valve 204, dump valve 206 and pneumatic back-up valve 208 secured to the top face 124b of the inner housing 124, in this example, by means of fasteners such as bolts or screws. The supply inlet 112 comprises a cylindrical tube which is integrally formed with the top face 124b of the inner housing 124 and extends normally from the centre of the top face 124b of the inner housing. A seal 214, in this example an O-ring, is mounted around the supply inlet, supported by a shoulder 216 in the inner housing 124 which extends radially outwardly of the supply inlet 112. Either side of the supply inlet 112 are located a control inlet 123a and a control exhaust 123b which, in this example, are also cylindrical tubes which are integrally formed with the top face 124b of the inner housing 124. Seals 218, 220 are, again in this example O-rings, are mounted around the control inlet 123a and control exhaust 123b respectively, supported by a shoulder 216 in the inner housing 124 which extends radially of the control inlet 123a and control exhaust 123b.

As best illustrated in FIG. 6b, the supply inlet 112, control inlet 123a and control exhaust 123b lie on a generally straight line with the supply inlet 112 between the control inlet 123a and control exhaust 123b. The hold valve 204 and pressure transducer port 212 lie on one side of this line, whilst the dump valve 206 and pneumatic back-up valve 208 lie on the other side of this line, the dump valve 206 being adjacent the control exhaust 123b and the pneumatic back-up valve 208 being adjacent the control inlet 123a.

As best illustrated in FIGS. 6c and 6d, each valve member 204c, 206c, 208d of the control valve assembly 200 is mounted in a cylindrical valve space 204e, 206e, 208e enclosed by a side wall integrally formed with the top face 124b of the inner housing 124. Three apertures are provided in the top face 124b of the inner housing 124, each connecting one of the cylindrical valve spaces 204e 206e, 208e with the control chamber 122. The apertures therefore form the outlet 204b, 206b, 208b of the hold valve 204, dump valve 206 and pneumatic back-up valve 208 respectively. A slight ridge in the top face 124b of the inner housing 124 around the aperture provides a valve seat, and, when in the closed position, each valve member 204c, 206c, 208c is engaged with this seat to substantially prevent flow of fluid between the cylindrical valve space 204e, 206e, 208e and the control chamber 122.

Each support housing 204d, 206d, 208d comprises a tube which extends around the valve member 204c, 206c, 208c into the cylindrical valve space 204e, 206e, 208e, a substantially fluid tight seal, in this example an O-ring, being provided between the support housing 204d, 206d, 208d and the top face 124b of the inner housing 124. The resilient biasing element in this example comprises a helical spring 204g, 206g, 208g which is located in the cylindrical valve space 204e, 206e, 208e around the end of the valve member 204c, 206c, 208c adjacent the outlet 204b, 206b, 208b. The spring 204g of the hold valve 204 extends between a shoulder provided on the valve member 204c and the support housing 204d so as to bias the valve member 204c into engagement with the valve seat, as does the spring 206g of the dump valve 206. In contrast, the spring 208g of the pneumatic back-up valve 208 extends between a shoulder provided on the valve member 208c and the top face 124b of the inner housing 124, so as to bias the valve member 208c out of engagement with the valve seat.

In this example, the inner housing 124 is also provided with a pressure transducer port 212 which is integrally formed in the top face 124b of the inner housing 124 and extends from the top face 124b of the inner housing 124 into the main chamber 130 via an aperture provided in the side wall 124c of the inner housing 124.

As best illustrated in FIG. 6b, four connecting passages are integrally formed in the top face 124b of the inner housing 124. The first connecting passage 222 connects the cylindrical valve space 204e of the hold valve 204 with the supply inlet 112, and thus forms the inlet 204a of the hold valve. The second connecting passage 224 connects the cylindrical valve space 206e of the dump valve 206 with the control exhaust 123b and thus forms the inlet 206a of the hold valve. The third connecting passage 226 connects the cylindrical valve space 208e of the pneumatic back-up valve 208 with the control inlet 123a, and thus forms the inlet 208a of the pneumatic back-up valve 208. Finally, the fourth connecting passage 228 connects the pressure transducer port 212 to the main chamber 130.

It will be appreciated that these connecting passages 222, 224, 226, 228 complete the connections illustrated schematically in FIG. 5, and allow the modulator 111 to be operated as described above.

In order to provide connections to a vehicle braking system, an outer housing 230, which is illustrated in FIGS. 6d and 6e, is mounted over the inner housing 124. In this embodiment of the invention, the outer housing 230 comprises a top cap which encloses the side wall 124a and top face 124b of the inner housing 124, the end cap 124c extending out of and not being enclosed by the outer housing 230. The top cap of the outer housing 230 includes a generally cylindrical side wall 230a which engages with the two seals 125a, 125b to provide a substantially fluid tight seal. The top cap of the outer housing 230 also includes a top face 230b which closes one end of the side wall 230a.

The top cap of the outer housing 230 is provided with a delivery port 232 which extends from the exterior of the outer housing 230 through the side wall 230a and into the annular space between the side walls of the inner housing 124 and outer housing 230 and the two seals 125a, 125b. The top cap of the outer housing 230 is also provided with a supply port 234 which comprises a tube integrally formed with the top face 230b of the outer housing 230. This extends from the exterior of the outer housing 230 to engage with the seal, O-ring 214, around the supply inlet 112 in the inner housing 124. By virtue of this seal 214, the supply port 234 and supply inlet 112 together provide a substantially fluid tight conduit between main chamber 130 of the valve member assembly and the exterior of the outer housing 230.

Whilst the outer housing 230 may comprise just a top cap which provides a first port and a second port with a first and a second mating part to engage with the supply inlet 112 and the delivery port 114 of the modulator, in this case, as the modulator also includes a control inlet 123a and a control exhaust 123b, the top cap also provides ports and mating parts to engage with the control inlet 123a and control exhaust 123b.

In this example, the top cap of the outer housing 230 is also provided with a control port 236 which comprises a tube integrally formed with the top face 230b of the outer housing 230. This extends from the exterior of the outer housing 230 to engage with the seal, O-ring 218, around the control inlet 123a in the inner housing 124. Similarly, in this example, the top cap of the outer housing 230 is also provided with an exhaust port 238 which comprises a tube integrally formed with the top face 230b of the outer housing 230. This extends from the exterior of the outer housing 230 to engage with the seal, O-ring 220, around the control exhaust 123b in the inner housing 124. By virtue of these seals 218, 220, the control port 236 and control inlet 123a together and the exhaust port 238 and control exhaust 123b together both provide a substantially fluid tight conduit between the exterior of the outer housing 230 and the control chamber 122 of the valve member assembly, via the back-up valve 208 and dump valve 206 respectively.

In this example, the side wall 230a of the outer housing 230 is made from die cast metal, whilst the top face 230b is made from a polymer, an O-ring 246 being provided to ensure a substantially fluid tight seal between the two parts of the outer housing 230.

An electronic circuit board (ECB) 240 is mounted in the top cap of the outer housing 230 so that it lies between the top faces 124b, 230b of the inner 124 and outer 230 housings. The electrical solenoids 204h, 206h, 208h required for operating the hold valve 204, dump valve 206 and pneumatic back-up valve 208 respectively are mounted on the ECB 240, so that they envelope their respective support housing 204d, 206d, 208d (best illustrated schematically in FIG. 5). A pressure transducer 244 is also mounted on the ECB 240 so that it engages in a fluid tight manner with the pressure transducer port 212 and can therefore measure the fluid pressure in the main chamber 130.

The ECB 240 includes the required electronic connections and components for controlling flow of an electrical current to the solenoids 204h, 206h, 208h, and for obtaining an electrical pressure signal from the pressure transducer 244. An electrical connector 242 is provided on the outer housing 230 and this provides an external electrical connection to the ECB 240. Preferably the electrical connector 242 is configured to be connectable to a four pin CAN bus.

Thus, when the valve assembly 110 is used in a vehicle braking system, the supply port 234 is connected to a source of pressurised fluid, a compressed air reservoir for example, the control port 236 is connected to the source of a fluid pressure braking demand signal, the delivery port 232 is connected to a fluid pressure operated brake actuator, and the electrical connector 242 is connected to the main electronic control unit of the braking system.

An alternative configuration of the valve assembly 110 is illustrated in FIGS. 7a, 7b, 7c and 7d In this configuration, the supply inlet 112 also comprises a tube which is integrally formed with the top face 124b of the inner housing 124, but differs from the embodiment of the invention illustrated in FIGS. 6a, 6b, 6c and 6d in that the supply inlet 112 extends initially normally from the centre of the top face 124b of the inner housing 124, but then bends through around 90° and extends towards the circumference of the top face 124b. A seal 214, in this example an O-ring, is mounted in a groove around the end of the supply inlet 112, which lies on a diagonal at around 45° to and facing up from the top face 124b of the inner housing 124. This engages with a correspondingly angled face of the supply port 234 of the outer housing 230.

Moreover, the control inlet 123a, is again integrally formed with the top face 124b of the inner housing 124, but extends from the valve space 208e of the pneumatic back-up valve 208 towards the circumference of the top face 124b. A seal 218, in this example an O-ring, is mounted in a groove around the end of the control inlet 123a, which also lies on a diagonal at around 45° to and facing up from the top face 124b of the inner housing 124. As with the supply inlet 112, this engages with a correspondingly angled face of the control port 236 of the outer housing 230.

Finally, in this embodiment of the invention, the control exhaust 123b extends from the valve space 206e of the dump valve 206 generally normally from the top face 124b of the inner housing 124. The exhaust port 238 of the outer housing comprises a tube which is integrally formed in the top face 230b of the outer housing 230 and extends from the exterior of the outer housing 230 into the control exhaust 123b in the inner housing 124.

A third embodiment of the valve assembly 110 is illustrated in FIGS. 8a, 8b, 8c and 8d. Again, this embodiment of the invention differs from the previous version only in relation to the configuration of the supply inlet 112, control inlet 123a and control exhaust 123b in the inner housing 124, and the manner of their engagement with the supply port 234, control port 236 and exhaust port 238 in the outer housing 230. In this case, the configuration is very similar to the first embodiment illustrated in FIGS. 6a, 6b, 6c, 6d, and 6e in terms of the positioning of the supply inlet 112, the control inlet 123a and the control exhaust 123b. In this embodiment, however, the seals with the outer housing 230 are all radial seals. In other words, each of the supply inlet 112, control inlet 123a and the control exhaust 123b comprises a tube which is integrally formed with and extends generally perpendicular to the top face 124b of the inner housing 124. The supply port 234, control port 236 and exhaust port 238 also each comprise a tube which is integrally formed with and extends generally perpendicular to the top face 230b of the outer housing 230 to surround the supply inlet 112, control inlet 123a and control exhaust 123b respectively. The O-rings 214, 218 and 220 are all mounted around the outer surface of the supply inlet 112, control inlet 123a and control exhaust 123b respectively and engage with the inner surface of the tube of the supply port 234, control port 236 and exhaust port 238 respectively, so as to provide a substantially fluid tight seal between the adjacent parts. By virtue of this arrangement all the seals between the inner housing 124 and the outer housing 230 are between surfaces which extend generally parallel to the side walls 124a and 230a of the inner 124 and outer housings 230. This means that some sliding movement of the inner housing 124 with respect to the outer housing 230 can be accommodated without the integrity of these seals being compromised.

Whilst in the embodiments of the invention described above, the outer housing 230 has only one delivery port 232, it should be appreciated that more than one port into the annular space between the housings 124, 230 and the two O-rings 125a, 125b may be provided in the outer housing 230. When used in a vehicle braking system, this enables the valve assembly 110 to provide pressurised fluid to more than one brake actuator. Significantly, to do this, requires only a change in the configuration of the outer housing 230. Thus, the same modulator 111 may be used regardless of how many brake actuators the valve assembly 110 is intended to control.

Similarly, by virtue of the use of an outer housing 230 the positions of the connections to the source of pressurised fluid (i.e. the supply port 234), and the fluid pressure braking demand signal (i.e. the control port), may be varied to accommodate different configurations of vehicle braking system, using a standard modulator 111 and by changing the configuration of the outer housing 230 only.

The outer housing 230, or at least the side walls 230a of the outer housing 230, may also be configured to receive and provide fluid connections to more than one modulator 111.

Whilst the outer housing 230 may comprise only the top cap, in these examples it also comprises a bottom cap 230c which covers the end cap 124c of the inner housing 124 of the modulator 111. The bottom cap 230c has one or more apertures through which fluid passing through the exhaust port 116 of the modulator may vent, and may also provide support for a valve member 250 such as that described in GB 2467958, which is designed to limit water/contaminant ingress into the modulator whilst permitting free flow of fluid out of the exhaust port 116.

An alternative embodiment of inner housing 124' is illustrated schematically in FIG. 9, and in perspective view in FIG. 10. This embodiment of inner housing 124' also has a generally cylindrical side wall 124a', and a generally circular top face 124b' which closes a first end of the side wall 124a', and an end cap 124c'. Again, in this example, the top face 124b' is integral with the side wall 124a', whilst the end cap 124c' is a separate component. A sealing element, in this example an O-ring 133', is located between the end cap 124c' and the side wall 124a', the sealing element substantially preventing flow of fluid into or out of the inner housing 124' other than via one of the supply inlet 112', delivery port 114', exhaust outlet 116' or control port 123'.

As in the first embodiment of inner housing 124 described above, the exhaust outlet 116' is an aperture provided in the end cap 124c', whilst the supply inlet 112' and control port 123' are provided in the top face 124b' of the inner housing 124'. In this embodiment of inner housing 124', however, the control port 123' is formed by an annular aperture which surrounds, and is coaxial with, the supply inlet 112'.

Moreover, in this embodiment of inner housing, the end cap 124c' is provided with a plurality of bayonet connector formations 300 which are spaced around an outer surface of the end cap 124c', and which extend generally perpendicular to the longitudinal axis A of the valve assembly 110'.

This alternative embodiment of the valve assembly 110' is placed in an outer housing 230', which is illustrated in FIGS. 11a, 11b and 12. Again, the outer housing 230' comprises a top cap which encloses the side wall 124a' and top face 124b' of the inner housing 124', the end cap 124c' extending out of the outer housing 230'. In this embodiment of the invention, however, the end cap 124c' of the valve assembly 110' is partially enclosed by the top cap of the outer housing 230'.

Again, the top cap of the outer housing 230' includes a generally cylindrical side wall 230a' which engages with the two seals 125a', 125b' to provide a substantially fluid tight seal, and a top face 230b which closes one end of the side wall 230a.

The top cap of the outer housing 230' is provided with a delivery port (not shown) which extends from the exterior of the outer housing 230' through the side wall 230a' and into the annular space between the side walls of the inner housing 124' and outer housing 230' and the two seals 125a', 125b'.

The top cap of the outer housing 230' is also provided with a supply port 234' which comprises a tube integrally formed with the top face 230b' of the outer housing 230'. This extends from the exterior of the outer housing 230' to engage with the seal around the supply inlet 112' in the inner housing 124'. By virtue of this seal, the supply port 234' and supply inlet 112' together provide a substantially fluid tight conduit between the main chamber 130 of the valve member assembly 110' and the exterior of the outer housing 230'.

Moreover, the top cap of the outer housing 230' is also provided with a control port 236' which comprises an annular aperture which surrounds and is coaxial with the supply port 234'. Again, this extends from the exterior of the outer housing 230 and the edges of this annular aperture engage with the seals around the control inlet 123a' in the inner housing 124'. By virtue of these seals, the control port 236' and control inlet 123a' together provide a substantially fluid tight conduit between the exterior of the outer housing 230 and the control chamber 122 of the valve member assembly.

This embodiment of the invention is not provided with a separate control exhaust, so fluid flow through the control port 236' is, in this embodiment, bi-directional, with fluid from the control chamber being exhausted through the control port 236'.

Again, an electronic circuit board (ECB) may be mounted in the top cap of the outer housing 230' so that it lies between the top faces 124b', 230b' of the inner 124' and outer 230' housings, just as described above.

This embodiment of outer housing 230' is provided with bayonet receiving formations 310 to engage with the bayonet connector formations 300 provided on the inner housing 124'. The bayonet receiving formations 310 comprise generally of L-shaped recesses in the interior surface of the side wall 230a' of the outer housing 230' at the end of the side wall 230a' opposite to the top face 230b'.

The valve assembly 110' is secured in the outer housing 230' by the conventional manner of using bayonet connectors, i.e. by pushing the valve assembly 110', top face 124b' first into the outer housing 230', orienting the valve assembly 110' so that the bayonet connector formations 300 slot into the bayonet receiving formations 310, and then rotating the valve assembly 110' relative to the outer housing 230'. In this way, the valve assembly 110' can only be removed from the outer housing 230' by rotating the valve assembly 110' back in the opposite direction. In use, the valve assembly 110' and outer housing are typically arranged with the top faces 124b', 230b' of the inner housing 124' and the outer housing 230', uppermost, so the valve assembly 110' is supported in the outer housing 230' by the bayonet connector formations 300.

It will be appreciated, of course, that, whilst in this example, the inner housing 124' is provided with the male bayonet connector formations 300, and the outer housing 230' with the female bayonet receiving formations 310, this need not be the case. The male bayonet connector formations 300 could equally be provided on the interior surface of the outer housing 230' and the bayonet receiving formations 310 on the exterior of the inner housing 124'.

Arranging the control port 123' coaxially with the supply port 112' facilitates the use of a bayonet-type connection between the inner housing 124' and outer housing 230', as this means that it is not necessary for the inner housing 124' to be in one particular orientation relative to the outer housing 230' for the control port 236' to be connected to the control inlet 123a'.

The use of a bayonet connector formation may be advantageous over the use of bolts to secure the inner housing of the modulator with respect to the outer housing, as a user could undo the bolts when the modulator is pressurised, and in this case, the pressure of fluid at the delivery port could cause one or both parts to fly off and injure the user. In contrast, when a bayonet connector formation is employed, fluid pressure at the delivery port exerts a force to separate the inner and outer housing. This pushes the bayonet connector formation hard against the bayonet receiving formation, with the result that the frictional forces between the two parts are so high that it is very difficult for a user to carry out the relative rotation of the parts required to separate them.

To further improve the locking of the outer housing with respect to the inner housing, one of the bayonet connector formation or the bayonet receiving formation may be provided with a small recess, and the other with a corresponding protuberance, the protuberance locating in the recess in a "click fit" arrangement when the two parts are in the desired orientation. This will further increase the force required to rotate the outer housing with respect to the inner housing when the modulator is pressurised.

This advantage can also be achieved with other locking arrangements in which; to disengage the outer housing and inner housing, a locking part must be slid over a surface generally perpendicular to the direction in which the inner housing is moved relative to the outer housing when placed in the outer housing. For example, a slide lock, as illustrated in FIG. 13, may be used.

In this embodiment, both the inner housing and outer housing are provided with a radially outwardly extending flange 400, 410, which are engaged when the outer housing is placed on the inner housing. To secure the two parts, a locking part 420, having a generally U-shaped cross-section, is slid over the two flanges 400, 410 so that the two flanges 400, 410 are clamped between two side arms 420a of the locking part 420. Again, when there is fluid pressure at the delivery port, this pushes the two flanges hard against the side arms 420a of the locking part 420, thus making it very difficult for a user to slide the locking part back off the flanges 400, 410. Moreover, as with the bayonet formation, a click fit arrangement may also be employed to further impede a user in removing the locking part 420 when the modulator is pressurised. In this case, the locking part may be provided with a protuberance which locates in a recess in one of the flanges, or one of the flanges may be provided with a protuberance which locates in a recess in one of the side arms 420a of the locking part 420.

Advantageously, two or more bayonet connector formation and bayonet receiving formations or two or more pairs of flanges and slide locks are provided.

It should be appreciated that the seals used in the modulator 111 need not be O-rings, and instead of having a generally circular cross-section, may be X or Z-shaped in cross-section, or may comprise a lip seal or any other suitable sealing means which allows relative movement of the two parts in question, whilst providing a seal between the two parts.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A valve assembly comprising an inner housing in which is provided a first port, a second port, and a third port, there being located within the inner housing a valve member assembly which is movable between a first position in which the second port is connected to the third port whilst the first port is closed by the valve member assembly, a second position in which the first port is connected to the second port whilst the third port is closed by the valve member assembly, and a third position in which at least two of the first, second and third ports are closed by the valve member assembly, wherein the valve assembly further comprises an outer housing which is separate from and encloses at least part of the inner housing, the outer housing having a first port and a second port, the inner housing and outer housing each being provided with first mating parts, which engage to provide a substantially fluid tight seal between the inner housing and the outer housing whilst enclosing a conduit for fluid communication between the first port of the inner housing and the first port of the outer housing, and second mating parts, which engage to provide a substantially fluid tight seal between the inner housing and the outer housing whilst enclosing a conduit for fluid communication between the second port of the inner housing and the second port of the outer housing.

2. A valve assembly according to claim 1 wherein the inner housing is provided with a fourth port flow which is connected to the valve member assembly such that the pressure of fluid at the fourth port controls movement of the valve member assembly between the first position, second position and the third position.

3. A valve assembly according to claim 2 wherein the outer housing is also provided with a third port and a third mating part which engage with the third mating part of the inner housing to provide a substantially fluid tight seal between the inner housing and the outer housing whilst enclosing a conduit for fluid communication between the fourth port of the inner housing and the third port of the outer housing.

4. A valve assembly according to claim 3 wherein the inner housing encloses a volume and the valve member assembly includes a movable element which divides the volume enclosed by the inner housing into a control chamber and a main chamber, the first, second and third ports extending into the main chamber, and the fourth port extending into the control chamber.

5. A valve assembly according to claim 3 wherein the first port and the fourth port are provided in the same side of the inner housing.

6. A valve assembly according to claim 5 wherein the fourth port in the inner housing comprises a generally annular aperture in the inner housing which surrounds and is substantially coaxial with the first port.

7. A valve assembly according to claim 4, wherein the inner housing is provided with a fifth port which is connected to the control chamber, and the outer housing is also provided with a fourth port and a fourth mating part which engages with a fourth mating part of the inner housing to provide a substantially fluid tight seal between the inner housing and the outer housing whilst enclosing a conduit for fluid communication between the fifth port of the inner housing and the fourth port of the outer housing.

8. A valve assembly according to claim 7 wherein the first port, the fourth port and the fifth port are provided in the same side of the inner housing.

9. A valve assembly according to claim 1 wherein the outer housing is provided with a plurality of ports in fluid communication with the second port of the inner housing.

10. A valve assembly according to claim 4 wherein the valve assembly further includes at least one electrically operated valve which controls flow of fluid into and out of the control chamber.

11. A valve assembly according to claim 10 wherein the outer housing is formed in two parts, the ports being provided in a first part of the outer housing, and electrical control components by means of which operation of the at least one electrically operated valve may be effected being mounted on the second part.

12. A valve assembly according to claim 1 wherein the outer housing may include an aperture which is in fluid communication with the third port of the inner housing.

13. A valve assembly according to claim 12 wherein the outer housing supports a valve member which is adapted to restrict flow of fluid through the third port of the inner housing into the inner housing.

14. A valve assembly according to claim 1 wherein the inner housing is placed in the outer housing by translational movement in a first direction, and the inner housing is secured relative to the outer housing by a locking means which comprises a locking part which engages with the surface of one or both of the inner housing and outer housing to prevent separation of the inner housing and outer housing, release of the locking means to permit separation of the inner housing and outer housing being achieved by sliding the locking part along said surface in a second direction generally perpendicular to the said first direction.

15. A valve assembly according to claim 14 wherein the inner housing is secured relative to the outer housing by means of a bayonet connection.

16. A valve assembly according to claim 15 wherein the inner housing is provided with a male bayonet connector formation which is located in a corresponding recess provided in the outer housing.

17. A valve assembly according to claim 14 wherein the inner housing is secured relative to the outer housing by means of a slide lock.

* * * * *